US012730900B2

(12) United States Patent
Hotchi et al.

(10) Patent No.: US 12,730,900 B2
(45) Date of Patent: Sep. 8, 2026

(54) SYSTEM DESIGN DEVICE, SYSTEM DESIGN METHOD, AND STORAGE MEDIUM

(71) Applicant: NEC Corporation, Tokyo (JP)

(72) Inventors: Ryosuke Hotchi, Tokyo (JP); Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 63 days.

(21) Appl. No.: 18/875,856

(22) PCT Filed: Aug. 26, 2022

(86) PCT No.: PCT/JP2022/032256
§ 371 (c)(1),
(2) Date: Dec. 17, 2024

(87) PCT Pub. No.: WO2024/042719
PCT Pub. Date: Feb. 29, 2024

(65) Prior Publication Data
US 2025/0384143 A1 Dec. 18, 2025

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
See application file for complete search history.

(56) References Cited

U.S. PATENT DOCUMENTS 12,282,562 B2 * 4/2025 Stolbikov ............... G06F 21/57
2018/0068241 A1 3/2018 Varkey et al.

FOREIGN PATENT DOCUMENTS

JP 2008-107982 A 5/2008
JP 2013-152577 A 8/2013

OTHER PUBLICATIONS

International Search Report for PCT Application No. PCT/JP2022/032256, mailed on Oct. 4, 2022.

(Continued)

*Primary Examiner* — Rodman Alexander Mahmoudi
(74) *Attorney, Agent, or Firm* — Sughrue Mion, PLLC

(57) ABSTRACT

First configuration information is acquired, which includes information on a topology using components of any one component of nodes in a computer system and an edge indicating a relationship between nodes. A configuration of a topology of first configuration information is concretized. Whether or not a security threat event may occur in a node or an edge in the configuration of the concretized topology is determined, and configuration information is generated in which information indicating a relationship between the configuration component in which a threat may occur if the threat event may occur and another configuration component in which another threat contributing to the occurrence of the threat may occur, is added. Whether the content of each threat is concrete or abstract in a threat chain path based on the relationship between the threat in the configuration information and another threat that contributes to the occurrence of the threat, is determined, and whether or not a design is insecure if the content of the threat is concrete or if it is abstract, is determined.

7 Claims, 17 Drawing Sheets

(56) References Cited

OTHER PUBLICATIONS

Lukas Gressl et al., Design Space Exploration for Secure IoT Devices and Cyber-Physical Systems, ACM Transactions on Embedded Computing Systems, vol. 20, No. 4, May 2021.
Sian En Ooi et al., Intent-Driven Secure System Design: Methodology and Implementation, Preprint submitted to Computers & Security, Mar. 15, 2022.

* cited by examiner

FIG. 4

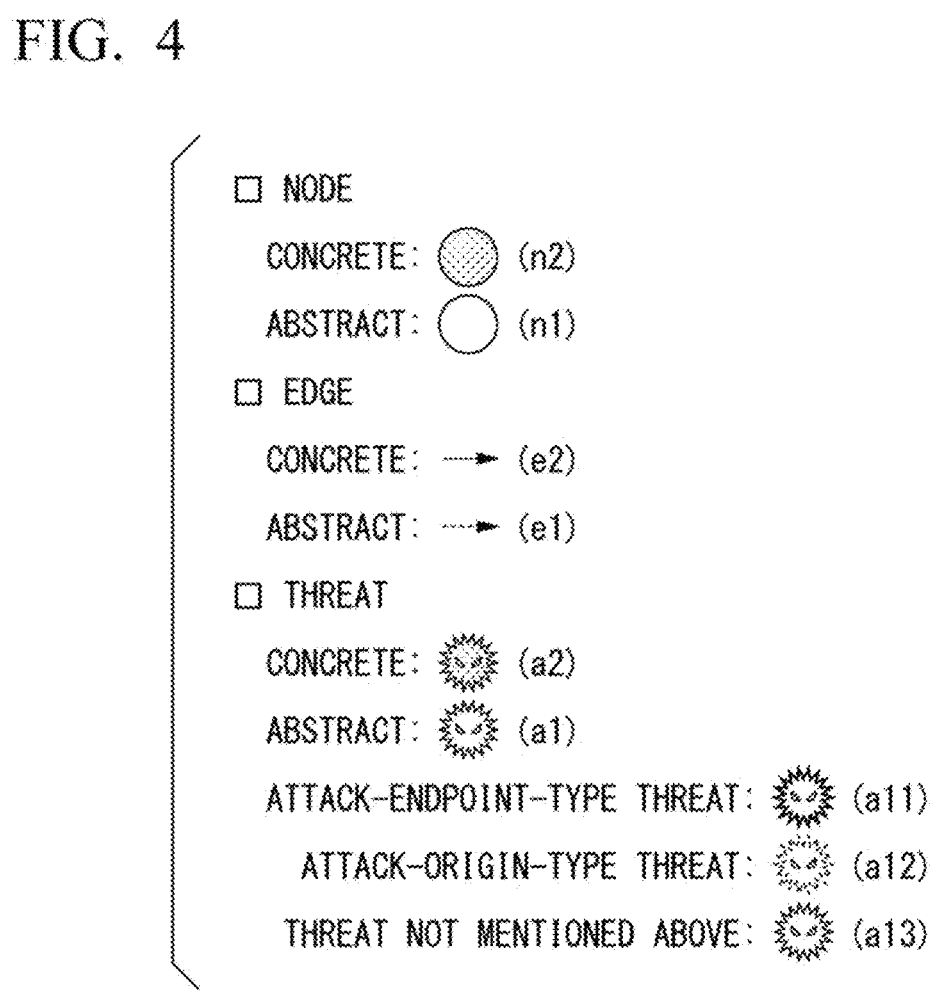

☐ NODE

CONCRETE: (n2)

ABSTRACT: (n1)

☐ EDGE

CONCRETE: (e2)

ABSTRACT: (e1)

☐ THREAT

CONCRETE: (a2)

ABSTRACT: (a1)

ATTACK-ENDPOINT-TYPE THREAT: (a11)

ATTACK-ORIGIN-TYPE THREAT: (a12)

THREAT NOT MENTIONED ABOVE: (a13)

FIG. 5

<FIRST CONFIGURATION INFORMATION>

```
"CONFIGURATION":[
  "NODE":[
    {
      "id": "App1",
      "TYPE": "APP"
    },
    {
      "id": "App2",
      "TYPE": "APP"
    }]
  "EDGE":[
    {
      "CONNECTION ORIGIN": "App1",
      "TYPE"    : "http",
      "CONNECTION DESTINATION": "App2"
    }]
  "THREAT":[
    {
      "TYPE"      : "T_NetSni",
      "LOCATION"     :"EDGE(App1,App2)",
      "ABSTRACTION LEVEL"   :"CONCRETE",
      "ATTACK TYPE"   :"ENDPOINT TYPE",
      "CONCRETIZATION ORIGIN": [{}],
      "CONCRETIZATION DESTINATION": [{}]
    }]
}
```

FIG. 6

```
"TOPOLOGY CONCRETIZATION RULE":[
  {
    "CONCRETIZATION ORIGIN CONFIGURATION":[
      {
        "NODE-ID" : "app_A",
        "NODE-TYPE" : "APP"
      }
    ],
    "CONCRETIZATION DESTINATION CONFIGURATION":[
      {
        "NODE-ID" : "app_A",
        "NODE-TYPE" : "APP"
      },
      {
        "NODE-ID" : "os_A",
        "NODE-TYPE" : "OS"
      },
      {
        "EDGE-CONNECTION ORIGIN":"app_A",
        "EDGE-TYPE"      : "hosted_on",
        "EDGE-CONNECTION DESTINATION":"os_A"
      }
    ],
  },
  { … },
  …
  { … }
]
```

Figure 10:
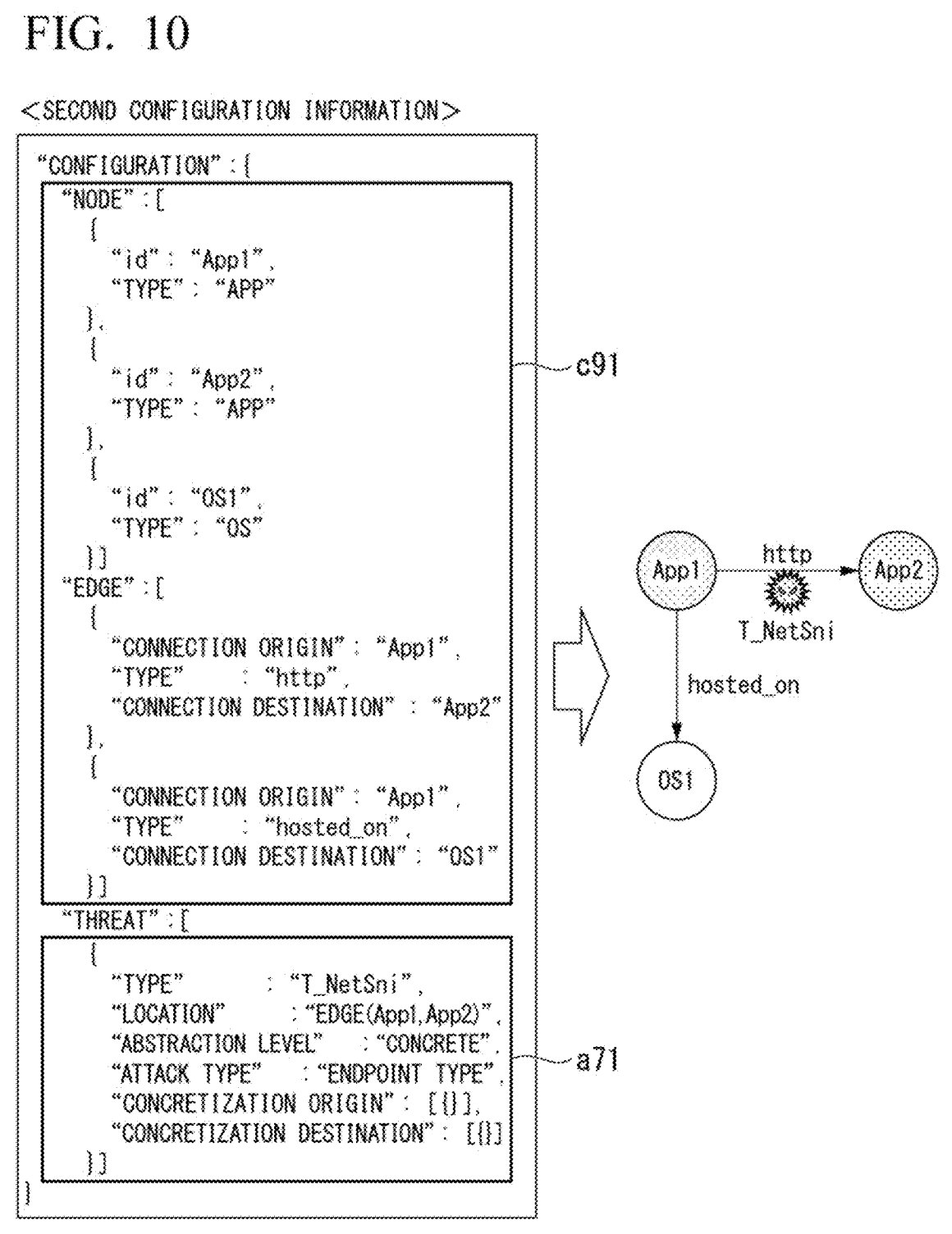

<SECOND CONFIGURATION INFORMATION>

```
"CONFIGURATION" : {
  "NODE" : [
    {
      "id" : "App1",
      "TYPE" : "APP"
    },
    {
      "id" : "App2",
      "TYPE" : "APP"
    },
    {
      "id" : "OS1",
      "TYPE" : "OS"
    }]
  "EDGE" : [
    {
      "CONNECTION ORIGIN" : "App1",
      "TYPE"      : "http",
      "CONNECTION DESTINATION" : "App2"
    },
    {
      "CONNECTION ORIGIN" : "App1",
      "TYPE"      : "hosted_on",
      "CONNECTION DESTINATION" : "OS1"
    }]
  "THREAT" : [
    {
      "TYPE"         : "T_NetSni",
      "LOCATION"     : "EDGE(App1,App2)",
      "ABSTRACTION LEVEL"   : "CONCRETE",
      "ATTACK TYPE"    : "ENDPOINT TYPE",
      "CONCRETIZATION ORIGIN" : [{}],
      "CONCRETIZATION DESTINATION" : [{}]
    }]
}
```

c91 a71

App1 http

App2

T_NetSni hosted_on

Figure 11:
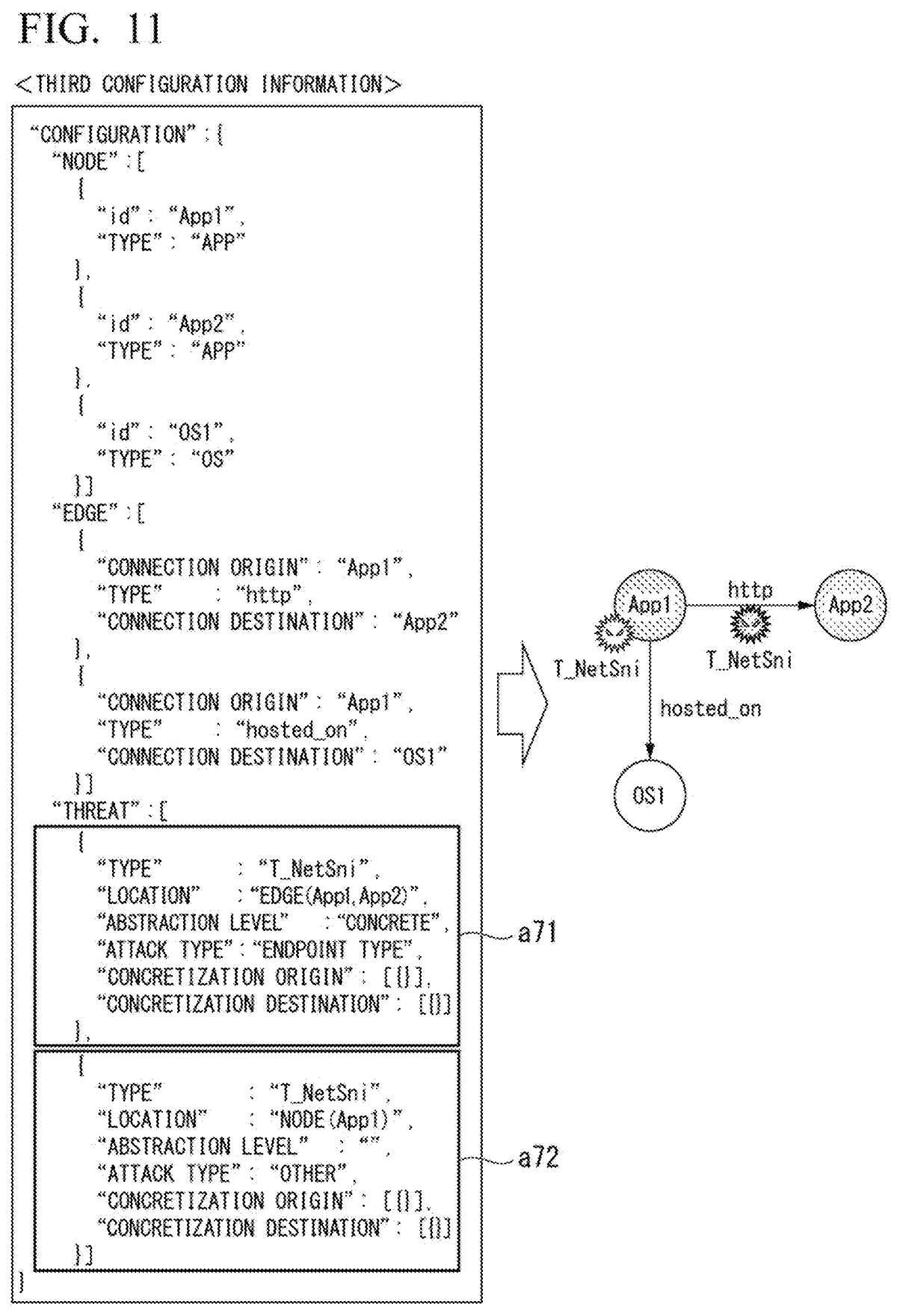

<THIRD CONFIGURATION INFORMATION>

```
"CONFIGURATION":{
  "NODE":[
    {
      "id": "App1",
      "TYPE": "APP"
    },
    {
      "id": "App2",
      "TYPE": "APP"
    },
    {
      "id": "OS1",
      "TYPE": "OS"
    }]
  "EDGE":[
    {
      "CONNECTION ORIGIN": "App1",
      "TYPE"    : "http",
      "CONNECTION DESTINATION": "App2"
    },
    {
      "CONNECTION ORIGIN": "App1",
      "TYPE"    : "hosted_on",
      "CONNECTION DESTINATION": "OS1"
    }]
  "THREAT":[
    {
      "TYPE"      : "T_NetSni",
      "LOCATION"   :"EDGE(App1,App2)",
      "ABSTRACTION LEVEL"  :"CONCRETE",
      "ATTACK TYPE":"ENDPOINT TYPE",
      "CONCRETIZATION ORIGIN": [{}],
      "CONCRETIZATION DESTINATION": [{}]
    },
    {
      "TYPE"      : "T_NetSni",
      "LOCATION"   : "NODE(App1)",
      "ABSTRACTION LEVEL"  : "",
      "ATTACK TYPE": "OTHER",
      "CONCRETIZATION ORIGIN": [{}],
      "CONCRETIZATION DESTINATION": [{}]
    }]
}
```

FIG. 12

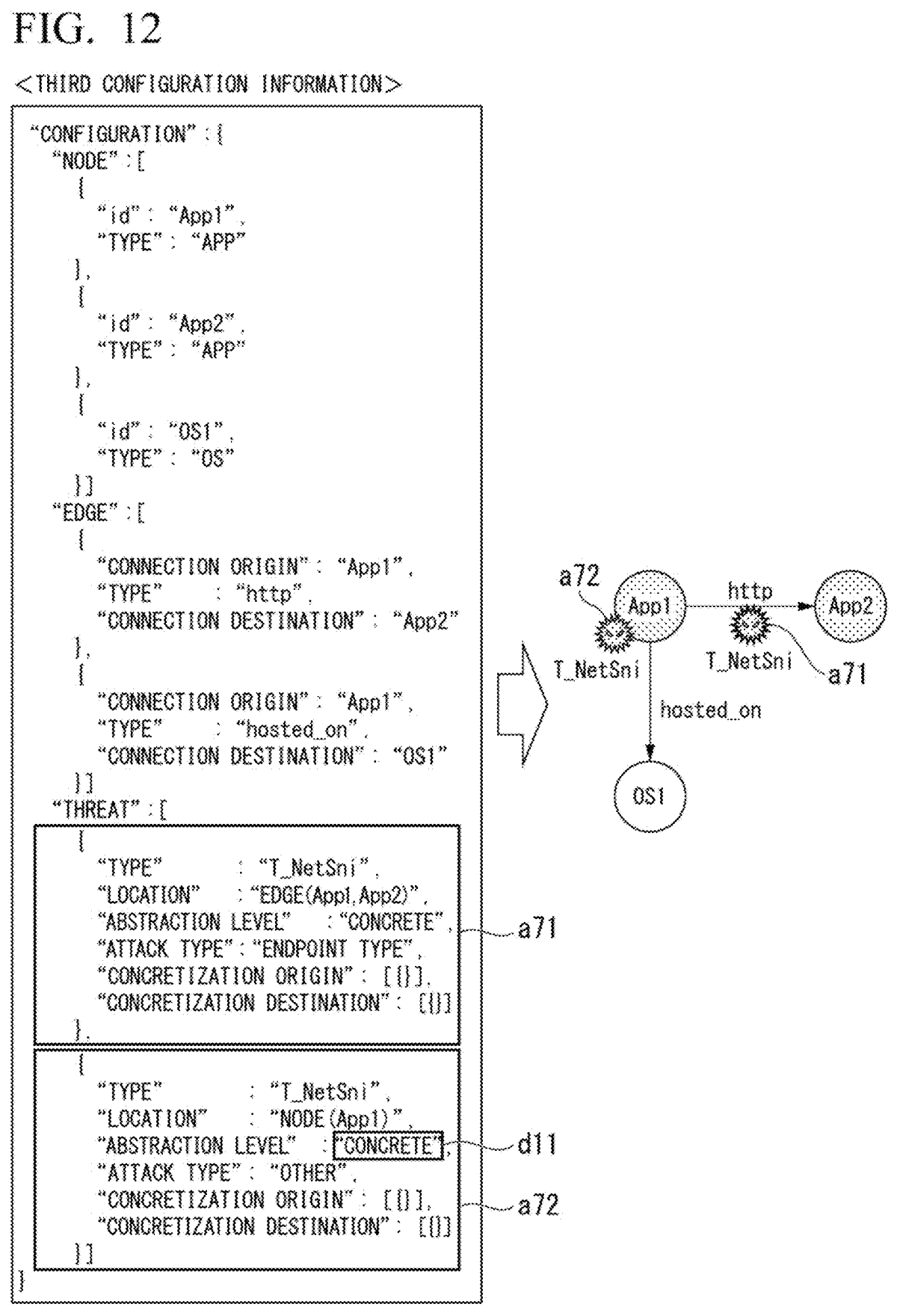

<THIRD CONFIGURATION INFORMATION>

```
"CONFIGURATION":{
  "NODE":[
    {
      "id": "App1",
      "TYPE": "APP"
    },
    {
      "id": "App2",
      "TYPE": "APP"
    },
    {
      "id": "OS1",
      "TYPE": "OS"
    }]
  "EDGE":[
    {
      "CONNECTION ORIGIN": "App1",
      "TYPE"     : "http",
      "CONNECTION DESTINATION": "App2"
    },
    {
      "CONNECTION ORIGIN": "App1",
      "TYPE"     : "hosted_on",
      "CONNECTION DESTINATION": "OS1"
    }]
  "THREAT":[
    {
      "TYPE"        : "T_NetSni",
      "LOCATION"    : "EDGE(App1,App2)",
      "ABSTRACTION LEVEL"   : "CONCRETE",
      "ATTACK TYPE": "ENDPOINT TYPE",
      "CONCRETIZATION ORIGIN": [{}],
      "CONCRETIZATION DESTINATION": [{}]
    },
    {
      "TYPE"        : "T_NetSni",
      "LOCATION"    : "NODE(App1)",
      "ABSTRACTION LEVEL"   : "CONCRETE",
      "ATTACK TYPE": "OTHER",
      "CONCRETIZATION ORIGIN": [{}],
      "CONCRETIZATION DESTINATION": [{}]
    }]
}
```

FIG. 13

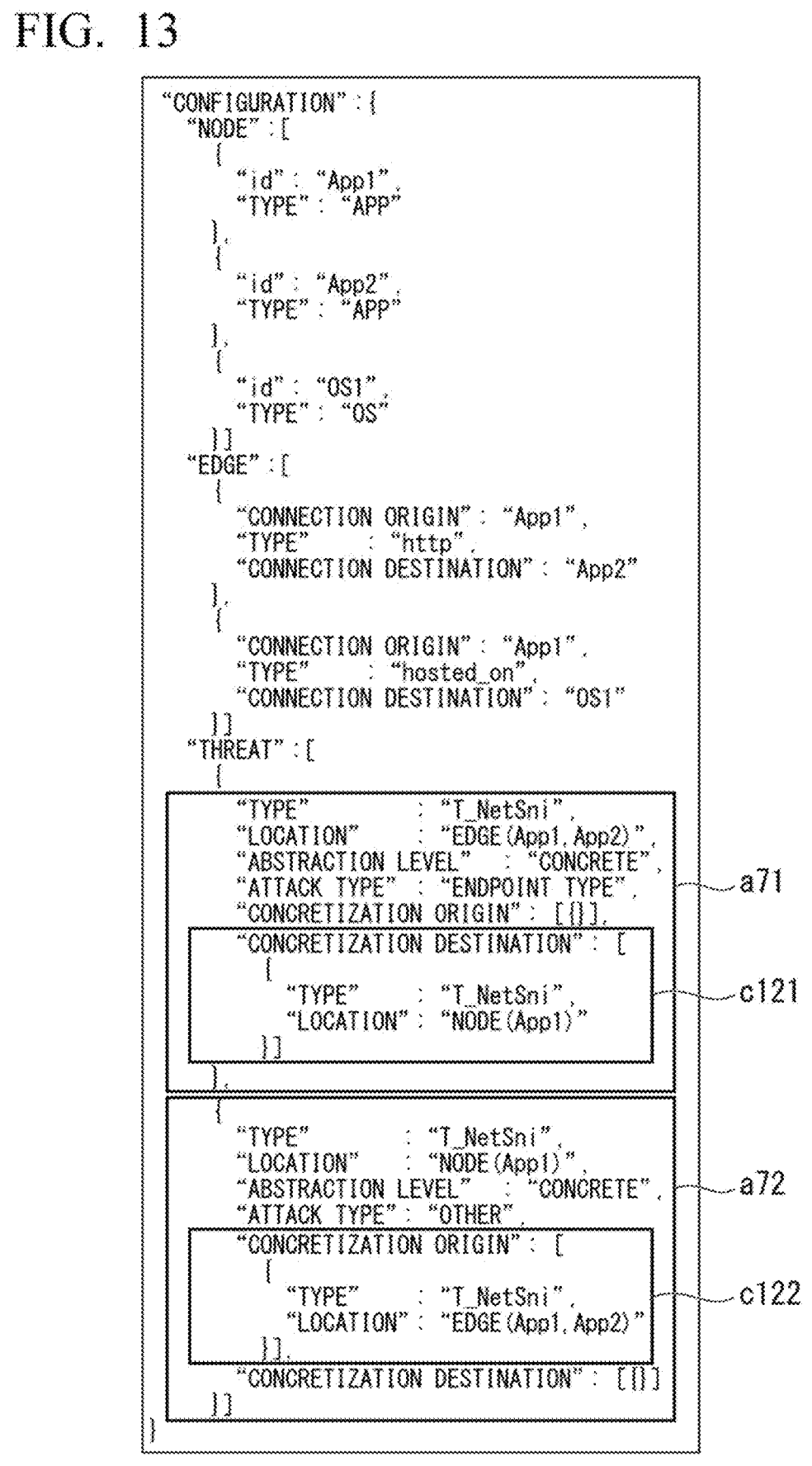

"CONFIGURATION":{
  "NODE":[
    {
      "id": "App1",
      "TYPE": "APP"
    },
    {
      "id": "App2",
      "TYPE": "APP"
    },
    {
      "id": "OS1",
      "TYPE": "OS"
    }]
  "EDGE":[
    {
      "CONNECTION ORIGIN": "App1",
      "TYPE"      : "http",
      "CONNECTION DESTINATION": "App2"
    },
    {
      "CONNECTION ORIGIN": "App1",
      "TYPE"      : "hosted_on",
      "CONNECTION DESTINATION": "OS1"
    }]
  "THREAT":[
    {
      "TYPE"          : "T_NetSni",
      "LOCATION"      : "EDGE(App1,App2)",
      "ABSTRACTION LEVEL"   : "CONCRETE",
      "ATTACK TYPE" : "ENDPOINT TYPE",
      "CONCRETIZATION ORIGIN": [{}],
      "CONCRETIZATION DESTINATION": [
        {
          "TYPE"     : "T_NetSni",
          "LOCATION": "NODE(App1)"
        }]
    },
    {
      "TYPE"          : "T_NetSni",
      "LOCATION"      : "NODE(App1)",
      "ABSTRACTION LEVEL"   : "CONCRETE",
      "ATTACK TYPE": "OTHER",
      "CONCRETIZATION ORIGIN": [
        {
          "TYPE"     : "T_NetSni",
          "LOCATION": "EDGE(App1,App2)"
        }],
      "CONCRETIZATION DESTINATION": [{}]
    }]
} a71 c121 a72 c122

SYSTEM DESIGN DEVICE, SYSTEM DESIGN METHOD, AND STORAGE MEDIUM

This application is a National Stage Entry of PCT/JP2022/032256 filed on Aug. 26, 2022, the contents of all of which are incorporated herein by reference, in their entirety.

TECHNICAL FIELD

The present disclosure relates to a system design device, a system design method, and a storage medium.

BACKGROUND ART

Non-Patent Document 1 and Non-Patent Document 2 disclose techniques for automatically designing a secure system configuration. These techniques first generate multiple system configuration plans, evaluate the security of each system configuration plan, and extract and output a system configuration plan that is evaluated as secure. The generated system configuration plan is a concrete system configuration, and security evaluation is performed based on the concrete system configuration.

PRIOR ART DOCUMENTS

Non-Patent Documents

Non-Patent Document 1: Lukas Gressl, Christian Steger, and Ulrich Neffe. "Design Space Exploration for Secure IoT Devices and Cyber-Physical Systems." ACM Transactions on Embedded Computing Systems (TECS) 20.4 (2021): 1-24.

Non-Patent Document 2: SE Ooi, R. Beuran, T. Kuroda, T. Kuwahara, R. Hotchi, N. Fujita, Y. Tan, "Intent-Driven Secure System Design: Methodology and Implementation", submitted to Elsevier Computers & Security, Mar. 15 2002.

SUMMARY OF INVENTION

Problems to be Solved by the Invention

In the design automation technique exemplified in Non-Patent Document 1, it is necessary to repeatedly generate and evaluate system configuration plans a number of times in order to search for a system configuration plan that satisfies condition, and derivation of a solution is thus time-consuming. Moreover, it is difficult to derive a secure system configuration by conducting a security evaluation in the same manner as that described in the same literature.

The automated secure system design technique exemplified in Non-Patent Document 2 is designed to subject a system configuration plan consisting of only concrete elements to a security determination in a case where the configuration plan is generated, and any configuration that is determined as being insecure is rejected and the search for another configuration plan is resumed. Any configuration plan that is determined as not being insecure is simply employed as the final output result. As a result, security determination cannot be performed until the automated design of the system configuration plan is completed, which results in the generation of a large number of insecure configuration plans to be rejected, and it takes a long time to derive a secure system configuration.

Thus, the present disclosure aims to provide a system design device, a system design method, and a storage medium that improve upon the literatures mentioned above.

Means for Solving the Problem

According to a first example aspect of the present disclosure, a system design device comprises: an acquisition means that acquires first configuration information at least including information on a topology of a computer system using configuration components in the computer system; a configuration concretization means that generates second configuration information that concretizes a configuration of the topology in the first configuration information; a threat concretization means that determines whether or not a security threat event may occur in the configuration component of the concretized topology, and generates third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information; and an analysis means that determines whether a content of each threat is concrete or abstract in a threat chain path based on a relationship between the threat in the third configuration information and another threat that contributes to the occurrence of the threat, and determines whether or not a design of a computer system in this third configuration information is insecure if a content of the threat is concrete or if it is abstract, wherein the analysis means determines the design of the computer system of the third configuration information as insecure if the content of the threat is all concrete in the threat chain path, or if the content of the threat is abstract in any configuration component of the threat chain path and it is determined that there is no means of avoiding the abstract threat from being replaced with a concrete threat.

According to a second example aspect of the present disclosure, a system design method comprises: acquiring first configuration information at least including information on a topology of a computer system using configuration components in the computer system; generating second configuration information that concretizes a configuration of the topology in the first configuration information; determining whether or not a security threat event may occur in the configuration component of the concretized topology, and generating third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information; determining whether a content of each threat is concrete or abstract in a threat chain path based on a relationship between the threat in the third configuration information and another threat that contributes to the occurrence of the threat, and determining whether or not a design of a computer system in this third configuration information is insecure if a content of the threat is concrete or if it is abstract; and determining the design of the computer system of the third configuration information as insecure if the content of the threat is all concrete in the threat chain path, or if the content of the threat is abstract in any configuration component of the threat chain path and it is determined that there is no means of avoiding the abstract threat from being replaced with a concrete threat.

According to a second example aspect of the present disclosure, a program or a recording medium has stored therein a program that causes a computer of a system design device to function as: an acquisition means that acquires first configuration information at least including information on a topology of a computer system using configuration components in the computer system; a configuration concretization means that generates second configuration information that concretizes a configuration of the topology in the first configuration information; a threat concretization means that determines whether or not a security threat event may occur in the configuration component of the concretized topology, and generates third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information; and an analysis means that determines whether a content of each threat is concrete or abstract in a threat chain path based on a relationship between the threat in the third configuration information and another threat that contributes to the occurrence of the threat, and determines whether or not a design of a computer system in this third configuration information is insecure if a content of the threat is concrete or if it is abstract, wherein the analysis means determines the design of the computer system of the third configuration information as insecure if the content of the threat is all concrete in the threat chain path, or if the content of the threat is abstract in any configuration component of the threat chain path and it is determined that there is no means of avoiding the abstract threat from being replaced with a concrete threat.

Effect of Invention

According to the present invention, there are provided a system design device, a system design method, and a storage medium capable, in computer system design, of efficiently outputting a design result of a system configuration that is not determined insecure, from among system configurations that concretize system requirements input by a user.

BRIEF DESCRIPTION OF DRAWINGS

FIG. 4 is a diagram showing nodes, edges, and threats displayed in a GUI according to the present example embodiment.

FIG. 5 is a diagram showing a concrete example of first configuration information according to the present example embodiment.

FIG. 6 is a diagram showing a description example of a topology concretization rule according to the present example embodiment.

FIG. 7 is a diagram showing a description example of a threat concretization rule according to the present example embodiment.

FIG. 10 is a diagram showing a concrete example of second configuration information according to the present example embodiment.

FIG. 11 is a first diagram showing a concrete example of third configuration information according to the present example embodiment.

FIG. 12 is a second diagram showing a concrete example of the third configuration information according to the present example embodiment.

FIG. 13 is a third diagram showing a concrete example of the third configuration information according to the present example embodiment.

EXAMPLE EMBODIMENT

Figure 1:
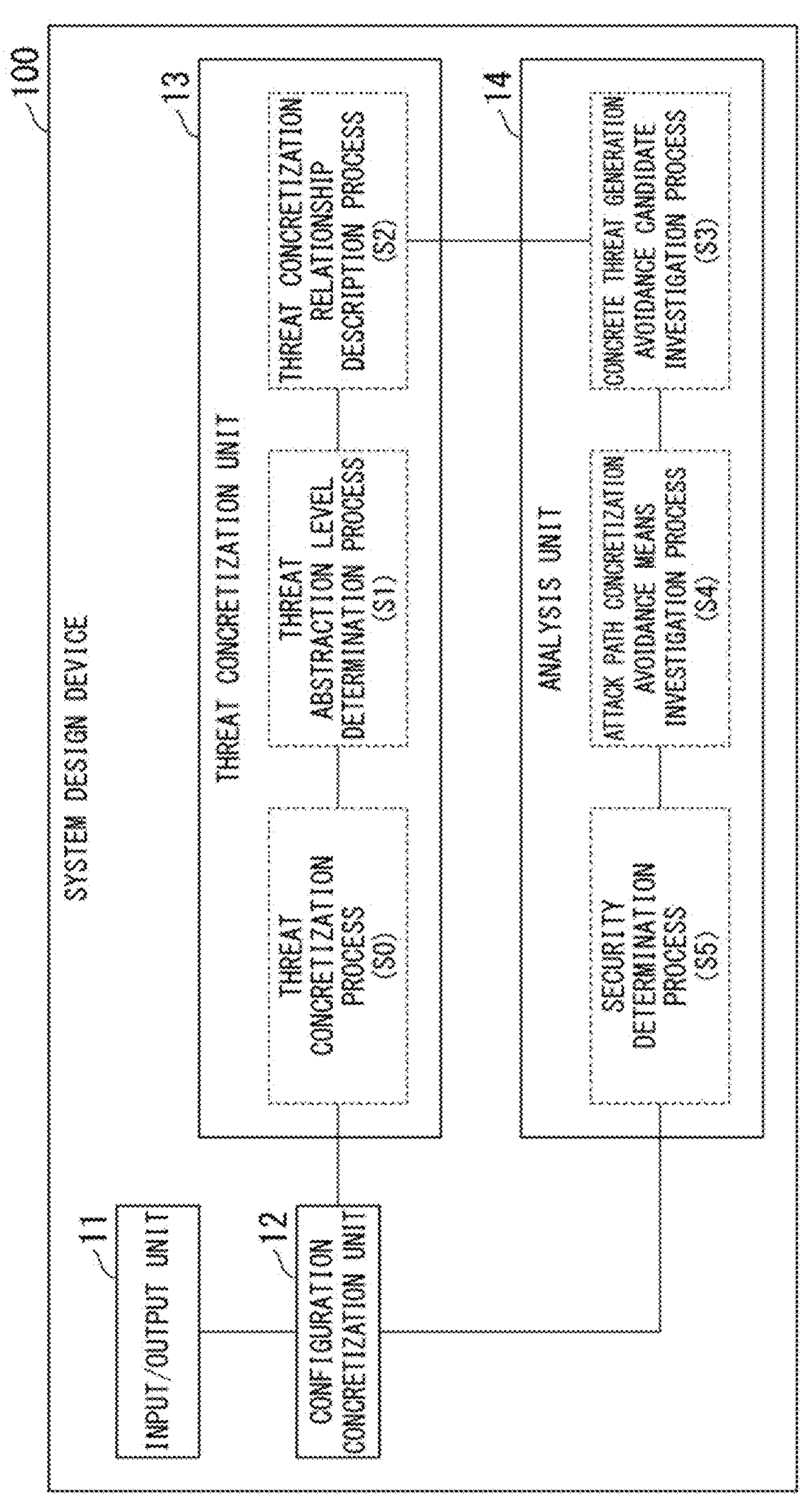
FIG. 1 is a schematic block diagram showing a functional configuration of a system design device according to the present example embodiment.

FIG. 1 is a schematic block diagram showing a functional configuration of a system design device according to the present example embodiment.

A system design device 100 shown in FIG. 1 automatically designs a highly secure computer system. The system design device 100 includes functions of an input/output unit 11, a configuration concretization unit 12, a threat concretization unit 13, and an analysis unit 14. These functions are implemented in a computer of the system design device 100 by the system design device 100 executing a system design program.

The input/output unit 11 accepts an input of first configuration information from a user, including system requirement information and information on threats to be avoided and transmits this to the configuration concretization unit 12, and it also outputs configuration information accepted from the configuration concretization unit 12 as a result of processing. The first configuration information includes at least information on the topology of a computer system that uses any configuration component of nodes in the computer system and edges indicating relationships between the nodes.

The configuration concretization unit 12 divides system requirements into multiple steps, concretizes them in a stepped manner, and generates configuration information as a result. For example, the configuration concretization unit 12 generates second configuration information that concretizes the topology configuration of the computer system by adding a node or edge of the computer system in the first configuration information. There are two modes for concretizing a topology configuration by the configuration concretization unit 12. The first concretization mode refers to adding components that concretize the configuration. The second concretization mode refers to selecting a concrete type of configuration. The configuration concretization unit 12 generates configuration information that concretizes the configuration of each topology included in the configuration information, according to a predetermined rule.

The threat concretization unit 13 determines whether or not an event that poses a threat to the security of the computer system may occur at a node or edge indicated by the configuration of the concretized topology. The threat concretization unit 13 generates third configuration information by adding information indicating a relationship between: an identifier of a threat if a threat event may occur; a configuration component in which the threat may occur; an identifier of another threat that contributes to the occurrence of the threat; and another configuration component in which the another threat may occur, to second configuration information. The threat concretization unit 13 performs the process of generating such third configuration information by dividing the process into a threat concretization process S0, a threat abstraction level determination process S1, and a threat concretization relationship description process S2.

After having performed the threat concretization process S0, the threat concretization unit 13 performs a threat abstraction level determination process S1 to determine whether all threats present in the received configuration information are abstract threats or concrete threats. Based on this determination, the threat concretization unit 13 performs labeling of each threat as either abstract or concrete, and then performs a threat concretization relationship description process S2.

In the threat concretization relationship description process S2, the threat concretization unit 13 adds information as to which threat has been concretized from which threat (hereinafter, referred to as "threat refinement relationship") to all threats involved in the threat concretization rules applied by the threat concretization unit 13 in the received configuration information.

The analysis unit 14 determines whether the content of each threat is concrete or abstract in the threat chain path based on the relationship between the threat in the second configuration information and another threat that contributes to the occurrence of the threat. The analysis unit 14 determines whether the design of the computer system in the first configuration information is insecure in both cases where the content of the threat is concrete and where the content of the threat is abstract. The analysis unit 14 determines the design of the computer system of the third configuration information as insecure if the content of the threat is all concrete in the threat chain path, or if the content of the threat is abstract in any configuration component of the threat chain path but it is determined that there is no means of avoiding the abstract threat from being replaced with a concrete threat. In performing such process, the analysis unit 14 performs a concrete threat generation avoidance candidate investigation process S3, an attack path concretization avoidance means investigation process S4, and a security determination process S5.

In the case where threats from an attack start point to an attack endpoint are connected in a threat chain route, the analysis unit 14 determines that an "attack path" has been generated. After having updated the information on the threat refinement relationship of the threat in the configuration information, the analysis unit 14 performs the concrete threat generation avoidance candidate investigation process S3.

In the concrete threat generation avoidance candidate investigation process S3, the analysis unit 14 investigates, for all abstract threats among the threats in the received configuration information, whether or not the threats may change into concrete threats in the future. Thereafter, the analysis unit 14 performs the attack path concretization avoidance means investigation process S4 using the result of this investigation together with the configuration information.

In the attack path concretization avoidance means investigation process S4, the analysis unit 14 determines whether there is an attack path in the received configuration information in which at least one abstract threat exists among the threats that constitute the chain route (hereinafter, referred to as an "abstract attack path"), and if so, investigates whether there is a means for avoiding the attack path from changing in the future into an attack path that constitutes a chain route consisting only of concrete threats (hereinafter, referred to as a "concrete attack path") (hereinafter, referred to as "attack path concretization"). The analysis unit 14 then performs the security determination process S5 using the result of this investigation together with the configuration information.

In the security determination process S5, if the received configuration information contains a concrete attack path or an abstract attack path that cannot be avoided from being concretized in the future, the analysis unit 14 determines the configuration plan as "insecure". Conversely, if there is no concrete attack path and, even if there is an abstract attack path, there is a means to avoid its concretization, the analysis unit 14 determines the configuration draft as "cannot be determined as non-secure". If the configuration information is determined as "cannot be determined as insecure", the analysis unit 14 outputs the determination result to the configuration concretization unit 12 together with the configuration information. If the configuration information is determined as "insecure", the analysis unit 14 rejects the configuration information and outputs to the configuration concretization unit 12 information indicating that the configuration information has been rejected.

Figure 2:
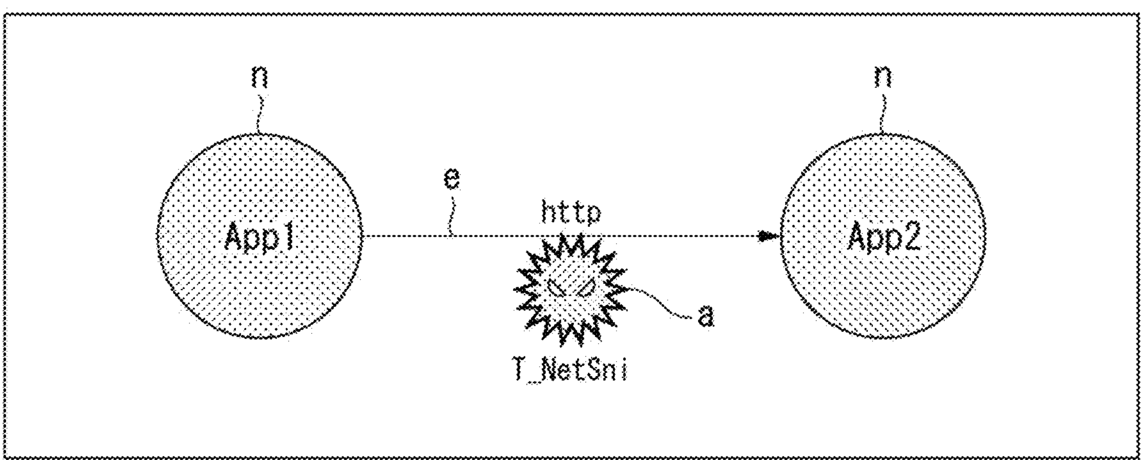
FIG. 2 is a diagram showing an example of system requirements in the present example embodiment.

FIG. 2 is a diagram showing an example of system requirements input by a user.

The user who performs automated computer system design inputs system requirements, using the interface of the system design device 100. As an example, the system design device 100 outputs a GUI (Graphical User Interface) screen to a display. This GUI screen displays options for node selection and edge selection. The user uses an input device connected to the system design device 100 to select a node or an edge from the options displayed on the GUI screen. The nodes and edges correspond to those in graph theory, and the concept of graph theory is applied to the automated computer system design. In the present example embodiment, a node may represent a hardware component or a software component of a computer system. In the present example embodiment, an edge indicates a relationship (for example, a connection relationship) between nodes. In a topology configuration of a computer system represented by nodes and edges, events that pose security threats may occur in configuration components of the computer system such as nodes and edges. The selection options on the GUI screen may include selection options that allow the selection of a component and the selection of a threat that may occur in the selected component. The user may use the selection options to select a configuration component and the security threat that may occur in the configuration component. The selection of the security threat that may occur in a certain configuration component may be automatically performed by the system design device 100. The system requirements in FIG. 2 show that two nodes are selected: a node on which a first application (App1) runs; and a node on which a second application (App2) runs, and that these nodes have a connection relationship via an edge indicating that these nodes are connected via HTTP communication. The system requirements in FIG. 2 also indicate that a threat of eavesdropping (T_NetSni) may occur in the edge. In a case where the user selects and registers system requirements, the input/output unit 11 of the system design device 100 acquires configuration information (first configuration information) corresponding to the system requirements. This configuration information is the first configuration information input from outside at the start of the process. Although the example system requirements shown in FIG. 2 show a simple computer system configuration in which two nodes are connected by an edge, the user may be able to input system requirements that indicate a more complex computer system configuration. As shown in FIG. 2, each node n is represented by a circle on the GUI screen. Moreover, edge e is represented by an arrow connecting node n and node n on the GUI screen.

Figure 3:
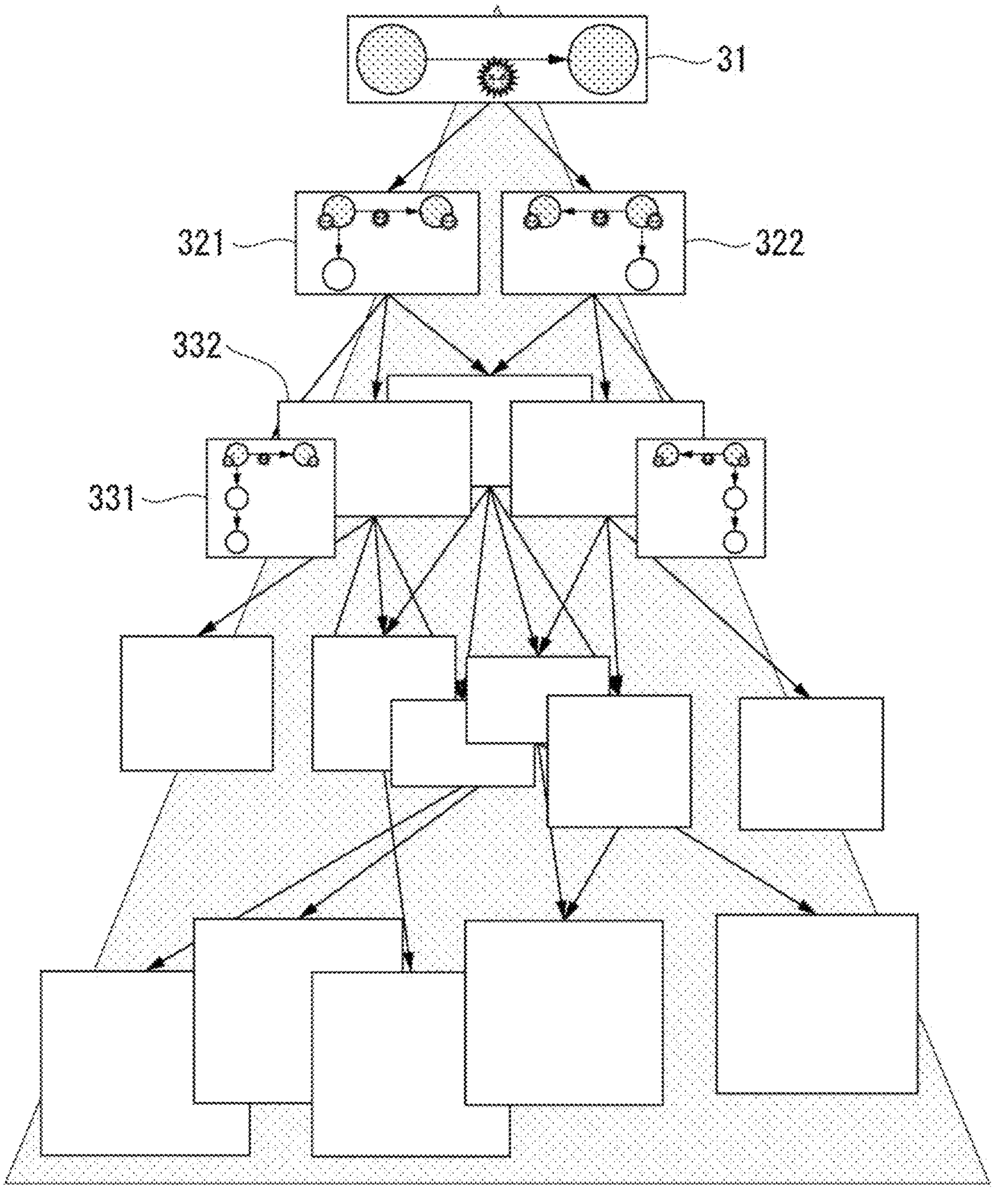
FIG. 3 is a diagram showing an overview of processing of the system design device according to the present example embodiment.

FIG. 3 is a diagram showing an overview of processing of the system design device.

FIG. 3 shows search tree data generated by the configuration concretization unit 12 of the system design device. The first configuration information 31 at the root of the search tree data in FIG. 3 is the first configuration information input from outside at the start of processing. The configuration concretization unit 12 of the system design device 100 generates second configuration information that concretizes a certain grouping unit of predetermined configuration components in the topology of the computer system of the first configuration information 31, and the threat concretization unit 13 generates third configuration information based on the second configuration information. The grouping unit of configuration components is set in advance, and one node may be treated as one group, or one node and one edge connected to that node may be treated as one group. Alternatively, multiple nodes and one or multiple edges connected to those nodes may also be treated as one group. Then, if the third configuration information cannot be determined as insecure, the analysis unit 14 outputs the third configuration information to the configuration concretization unit 12. The configuration concretization unit 12 adds the acquired third configuration information as new first configuration information 321 serving as information of a child node connected to the first configuration information 31 in the tree structure indicated by the search tree data. The configuration concretization unit 12 generates second configuration information that concretizes another group that has not been concretized among the grouping units of the predetermined configuration components in the topology of the computer system of the first configuration information 31, and the threat concretization unit 13 generates third configuration information based on the second configuration information. Then, if the third configuration information cannot be determined as insecure, the analysis unit 14 outputs the third configuration information to the configuration concretization unit 12. The configuration concretization unit 12 adds the acquired third configuration information as new first configuration information 322 serving as information of a child node connected to the first configuration information 31 in the tree structure indicated by the search tree data.

In a case where the concretization of all the configuration components of the first configuration information 31 is completed, the configuration concretization unit 12 selects, for example, one of the first configuration information 321 from the first configuration information 321, 322, and generates second configuration information that concretizes another group that has not been concretized among the grouping units of the predetermined configuration components in the topology of the computer system of the first configuration information 321, and the threat concretization unit 13 generates third configuration information based on the second configuration information. Then, if the third configuration information cannot be determined as insecure, the analysis unit 14 outputs the third configuration information to the configuration concretization unit 12. The configuration concretization unit 12 adds the acquired third configuration information as new first configuration information 331 serving as information of a child node connected to the first configuration information 321 in the tree structure indicated by the search tree data. If the third configuration information is determined as insecure, the analysis unit 14 may not output the third configuration information to the configuration concretization unit 12 and discard it, or the configuration concretization unit 12 may discard the third configuration information. Accordingly, the configuration information determined as insecure is discarded, and thus the system design can be determined as inappropriate at an early stage of a series of processes performed in the system design device 100 as a result of the system design.

The system design device 100 generates search tree data through the process described above, and outputs to the user as a system design result, the configuration information that could not be determined as insecure among the third configuration information that ultimately could not be concretized. The configuration information output may be one or multiple. For example, if there are multiple instances of configuration information among the terminal nodes in the search tree data that cannot be further concretized and that cannot be determined as insecure, these instances of configuration information may be output as design results. It should be noted that the system design device 100 cannot determine whether the configuration information is completely secure. For this reason, the system design device 100 determines that the configuration information at the end of the search tree data obtained through the configuration concretization process and the threat concretization process is insecure, and thereby outputs the configuration information that could not be determined as insecure, to the user as a system design result.

For convenience of description, FIG. 3 shows only a part of the first configuration information added as search tree data, and illustrates the example aspect of the network topology indicated by that configuration information. Moreover, the search tree data shown in FIG. 3 shows only a part of the search tree, however, in reality, the search tree is composed of nodes each indicating a larger amount of first configuration information.

FIG. 4 is a diagram showing nodes, edges, and threats displayed in a GUI.

As shown in FIG. 4, in the case where the background color of the circle representing node n is white, that node n represents an abstract node n1. Here, an abstract node refers to a node whose information, such as its type and version, has not been determined. More specifically, an abstract node refers to the following types of nodes.

(a1) A node of which the OS type and OS version have not been determined where the node represents an OS (Operating System).

(a2) A node of which the machine type has not been determined where the node represents a machine.

(a3) A node of which the application type has not been determined where the node represents an application.

Also, in the case where the background color of the circle representing node n is grey, that node n represents a concrete node n2. Here, a concrete node refers to a node whose information, such as its type and version, has been determined. More specifically, a concrete node refers to the following types of nodes.

(b1) A node of which the OS type and OS version have been determined where the node represents an OS (Operating System).

(b2) A node of which the machine type has been determined where the node represents a machine.

(b3) A node of which the application type has been determined where the node represents an application.

Moreover, in the case where the arrow of an edge e is a dotted line, the edge e represents an abstract edge e1, and in the case where the arrow of an edge e is a solid line, the edge e represents a concrete edge e2. The abstract edge e1 refers to an edge whose type is not concrete. The concrete edge e2 refers to an edge whose type is concrete. For example, in the case where the communication protocol of the edge e between two nodes included in configuration information has not been determined, it is shown as an abstract edge e1, and in the case where it has been determined, it is shown as a concrete edge e2. Threats are represented by dedicated icons a, and in the case where the background of the icon a is white, it represents an abstract threat a1, and in the case where the background of the icon a is gray, it represents a concrete threat a2. If a security hole or an attack that may occur in a node n or an edge e cannot be determined to exist, the threat is represented as an abstract threat a1 in the configuration information, and if it can be determined to exist, it is represented as a concrete threat a2. Also, based on the color of the border of the icon a, each icon a represents any one of an attack-endpoint-type threat a11, an attack-origin-type threat a12, or other threat a13. The attack-origin-type threat a12 is a threat that acts as a starting point that ultimately influences the occurrence of the attack-endpoint-type threat a11. An other threat a13 is a threat that arises as a result of the occurrence of the attack origin-type threat a12, or a threat that arises as a result of further influence from the occurrence of the threat in question, and the occurrence of the other threat a13 through one or more contributing chains ultimately affects the occurrence of the attack-endpoint-type threat all. Based on the selection of selection options, the user can confirm the system requirements they input by viewing icons a that represent nodes n, edges e, and threats displayed on the GUI screen.

In the present example embodiment, the configuration information may at least include information of "nodes", "edges", and "threats". In the configuration of a computer system, all configuration components must be concrete. A threat represents an attack that the user seeks to prevent the attacker from achieving, or the specific steps or operations the attacker might take to execute the attack. As mentioned above, there are three types of threats: "attack-endpoint-type threats (attack-destination-type threats)"; "attack-origin-type threats (attack-source-type threats)"; and "other threats", and an attack-endpoint-type threat specifically refers to an attack that the user seeks to prevent the attacker from achieving. An attack-origin-type threat refers to attack steps that the attacker can clearly execute. Other threats include all threats that are neither attack-endpoint-type threats nor attack-origin-type threats.

FIG. 5 is a diagram showing a concrete example of first configuration information.

The configuration information in FIG. 5 indicates the first configuration information corresponding to the system requirements shown in FIG. 2.

The first configuration information is represented by text. The first configuration information can be represented graphically as illustrated in FIG. 2.

The configuration information shown in FIG. 5 is represented in a JSON format description. The configuration information consists of a list of nodes, a list of edges, and a list of threats. Each node has a defined id and type. For each edge, the source node ID, the type of communication protocol connecting the connection origin node and connection destination node, and the connection destination node ID are defined. Whether nodes and edges are concrete or abstract is uniquely determined by their type.

For each threat, the threat type, the location where the threat can occur (configuration component such as node and edge), whether the threat is abstract or concrete, whether the threat is attack endpoint type, attack origin type, or other type, the threat concretization origin, and the threat concretization destination, are defined. The definitions of a threat concretization origin and threat concretization destination will be described later.

The location (configuration component) where a threat exists indicates whether the location of the existing threat is a node or an edge, and in parentheses "( )", the node ID is scripted if the location is a node, or the ids of the connection origin node and connection destination node are scripted if the location is an edge. This description method is merely an example and is not limited to this.

A status can be assigned to configuration components included in the configuration information indicating whether the threat that may occur is concrete or abstract. If the configuration component in which the threat occurs and its adjacent node or edge are all concrete and no configuration component that prevents the threat can be assigned to those configuration components, the threat can be determined as concrete (concrete threat), otherwise, the threat can be determined as abstract (abstract threat). In the concretization origin and concretization destination parts of the configuration information shown in FIG. 5, information is added in the threat concretization relationship description process S2 for the configuration component that is determined to have a threat occurring in the threat concretization process of the threat concretization unit 13.

FIG. 6 is a diagram showing a description example of a topology concretization rule.

A topology concretization rule is defined by a data file. The topology concretization rules are used in the configuration (topology) concretization process in the configuration concretization unit 12. The configuration concretization unit 12 uses a topology concretization rule to concretizes the topology configuration of the computer system by adding a node or edge of the computer system in the configuration information. The topology concretization rule defines two components, namely, a "concretization origin configuration" and a "concretization destination configuration". In the case where the topology configuration of the computer system included in the configuration information can be concretized, the configuration before concretization described in the configuration information is called a concretization origin configuration. Moreover, the configuration that can be added as a topology in the case where the configuration before concretization described in configuration information (concretization origin configuration) is concretized in detail, is called a concretization destination configuration.

The description of the concretization origin configuration included in the topology concretization rule defines the topological condition that must be satisfied in order for the topology concretization rule to be applied. Whether or not the topology concretization rule is actually applied is determined based on the description of this concretization origin configuration as well as the condition defined by the configuration concretization unit 12 side. For example, the configuration concretization unit 12 determines that a topology concretization rule that has a history of being applied in the past cannot be applied to the same concretization origin configuration, and based on this determination, determines whether the topology concretization rule is to be applied. In the example shown in FIG. 6, the existence of a node whose type is “APP” is the condition for applying the rule.

The description of the concretization destination configuration included in the topology concretization rule defines topology information that is generated by replacing the concretization origin configuration in a case where the topology concretization rule is applied. The configuration indicated in the concretization origin configuration is replaced by the configuration indicated in the concretization destination configuration by the topology concretization rule. In this replacement, if a node-id or edge-id described in the concretization origin configuration is not described in the concretization destination configuration, the node or edge will disappear in the configuration concretization process. In the example of the topology concretization rule shown in FIG. 6, if the configuration information includes a configuration component that satisfies the concretization origin configuration, a configuration concretization process is performed in which an “OS” type node, which is the concretization origin configuration, is additionally connected to an “APP” type node present in the configuration information using a “hosted_on” type edge. In such a case, “app_A” described in the concretization origin configuration is also described in the concretization destination configuration, and therefore the node for “app_A” does not disappear from the configuration information.

Figure 7:
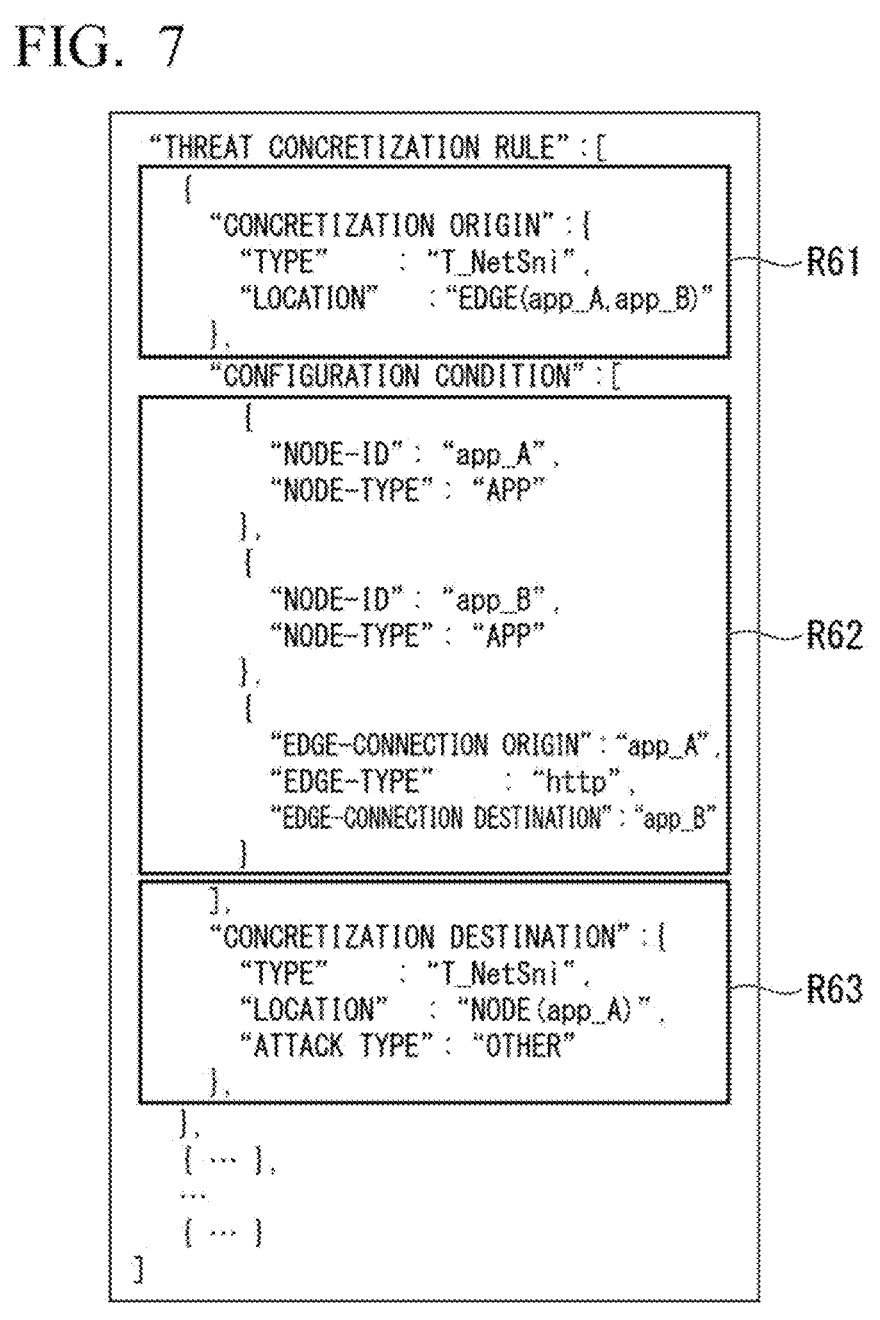

FIG. 7 is a diagram showing a description example of a threat concretization rule.

A threat concretization rule is defined by a separate data file from the topology concretization rule. The threat concretization rules are used in the threat concretization process in the threat concretization unit 13. As shown in FIG. 7, multiple threat concretization rules can be described in a list format, and each rule is established by defining three components, namely, “concretization origin (refined from)”, “configuration condition (topological assumption)”, and “concretization destination (refined to)”.

The concretization origin in a threat concretization rule refers to the threat to which the rule is applied, and the threat generated as a result of applying the threat concretization rule to the threat of the concretization origin (threat concretization process) is further described in the threat concretization rule as the concretization destination. In the case where a threat of a concretization origin (refined from) can occur based on the contribution of another threat, a threat concretization rule defines the relationship between the threat of a concretization origin (refined from) and the another threat of the concretization destination (refined from). As an example, if a threat of eavesdropping at an edge occurs due to the establishment of an eavesdropping threat at the connection origin node of the edge, the threat indicating eavesdropping at the edge is defined as the connection origin (refined from) and the threat indicating eavesdropping at the connection origin node of the edge is defined as the concretization destination (refined to) in the threat concretization rule. By the threat concretization unit 13 performing the threat concretization process using the threat concretization rule, it is possible to determine the continuity of the relationship (threat chain route) between a certain threat that can occur in a configuration component included in the configuration information and another threat that contributes to the occurrence of that threat. As the format of a threat concretization rule, information on a threat that must exist in order for the threat concretization rule to be applied and its occurrence location (configuration component) are defined. In the example of FIG. 7, a threat of type “T_NetSni (eavesdropping)” occurring on the “edge connecting app_A and app_B” in the configuration information is described as an application condition of the threat concretization rule. The “app_A” and “app_B” mentioned here are provisional node ids, and if they can be matched with a specific threat described in the configuration information, they are replaced with the corresponding node ids described in the configuration information and the threat concretization process is performed.

The configuration condition described in a threat concretization rule defines the configuration component that must be present in the configuration information (for example, second configuration information generated through the configuration concretization process based on the first configuration information in FIG. 5) in order for the threat concretization rule to be applied. If the configuration component described in the configuration condition of the threat concretization rule is not included in the configuration information (for example, second configuration information generated through the configuration concretization process based on the first configuration information in FIG. 5), the threat concretization rule cannot be applied. The node ids described in the configuration condition of the threat concretization rule are provisional node ids, and in a case where verifying whether the configuration component in which the concretization origin threat occurs is included in the configuration information, if a node id corresponding to the node id indicated in the configuration condition exists in the second configuration information generated through the configuration concretization process based on the first configuration information, the node id indicated in the configuration condition of the threat concretization rule is replaced with the node id in that configuration information, and the threat concretization process is performed. In a case where verifying whether or not the configuration component of the node id corresponding to the provisional node id described in the configuration condition of the threat concretization rule is included in the configuration information (second configuration information) as the configuration component where the concretization origin threat occurs, if it is not included, the threat concretization rule will not be applied.

The concretization destination in the configuration condition of the threat concretization rule refers to the threat generated as a result of applying the rule, and also refers to the threat that is connected to the threat of the concretization origin in a case where forming a chain route that sequentially indicates the threat and the relationship contributing to the occurrence of that threat. The format of the concretization destination in the configuration condition of the threat concretization rule is basically the same as the format of the concretization origin, however, an item "attack type" is added. The "attack type" item indicates whether the threat to be added to the configuration information as a concretization destination is an attack-endpoint-type threat, an attack-origin-type threat, or other.

The system design device 100 according to the present disclosure acquires first configuration information at least including information of a computer system topology using configuration components indicating at least one of nodes in the computer system and edges indicating relationships between the nodes. Based on a topology concretization rule, the system design device 100 generates second configuration information that concretizes the topology configuration of the computer system by adding a node or edge of the computer system in the first configuration information. In this process, the system design device 100 generates the second configuration information in which one of the grouping units of the predetermined configuration components in the topology of the computer system of the first configuration information input at the start of processing is concretized.

Moreover, the system design device 100 determines whether or not an event that poses a threat to the security of the computer system may occur in a node or edge in the concretized topology configuration, and generates third configuration information by adding information indicating a relationship between: an identifier of a threat if the threat event may occur; the configuration component in which the threat may occur; an identifier of another threat contributing to the occurrence of the threat; and another configuration component in which this another threat may occur, to the second configuration information.

The system design device 100 determines whether the content of each threat is concrete or abstract in a threat chain path based on the relationship between the threat in the third configuration information and another threat that contributes to the occurrence of the threat, and determines whether or not the design of the computer system in this third configuration information is insecure if the content of the threat is concrete or if it is abstract. In this determination, the system design device 100 determines the design of the computer system represented based on the third configuration information as insecure if the content of the threat is all concrete in the threat chain path, or if the content of the threat is abstract in any configuration component of the threat chain path but it is determined that there is no means of avoiding the abstract threat from being replaced with a concrete threat.

Then, the system design device 100 repeats the process of generating new second configuration information that concretizes one of grouping units of the predetermined configuration components in the topology of the computer system of the first configuration information, where the third configuration information, generated based on the second configuration information, and not determined as insecure in the design of the computer system, is used as the new first configuration information. The system design device 100 repeats the process of generating new third configuration information based on the second configuration information. The system design device 100 outputs the third configuration information as a design result if none of the grouping units of the predetermined configuration components in the topology of the computer system of the third configuration information can be further concretized and the design of the computer system of the third configuration information is not determined as insecure.

According to this process, the third configuration information generated through concretization of the configuration and the threat based on the first configuration information is added to the search tree data, and if the third configuration information is determined as insecure at a certain time in a case where the third configuration information is added to the search tree data, it is determined that a system that is not determined as insecure cannot be created with the system requirements included in the third configuration information, and the third configuration information is discarded without being added to the search tree data. This reduces the number of pieces of configuration information to be added in a case where generating the search tree data, and ultimately speeds up the detection of configuration information (third configuration information) that is added to the extremity of the search tree data and cannot be further concretized, and is not determined as insecure. Therefore, through such processing, the system design device 100 can speed up the output of a design result that is not determined as insecure for a computer system that concretizes the configuration and threat in accordance with the system requirements input by the user in the system design, thereby reducing the amount of time required for designing a system with a configuration that is not determined as insecure. Hereinafter, the processing performed by the system design device 100 will be described in detail.

Figure 8:
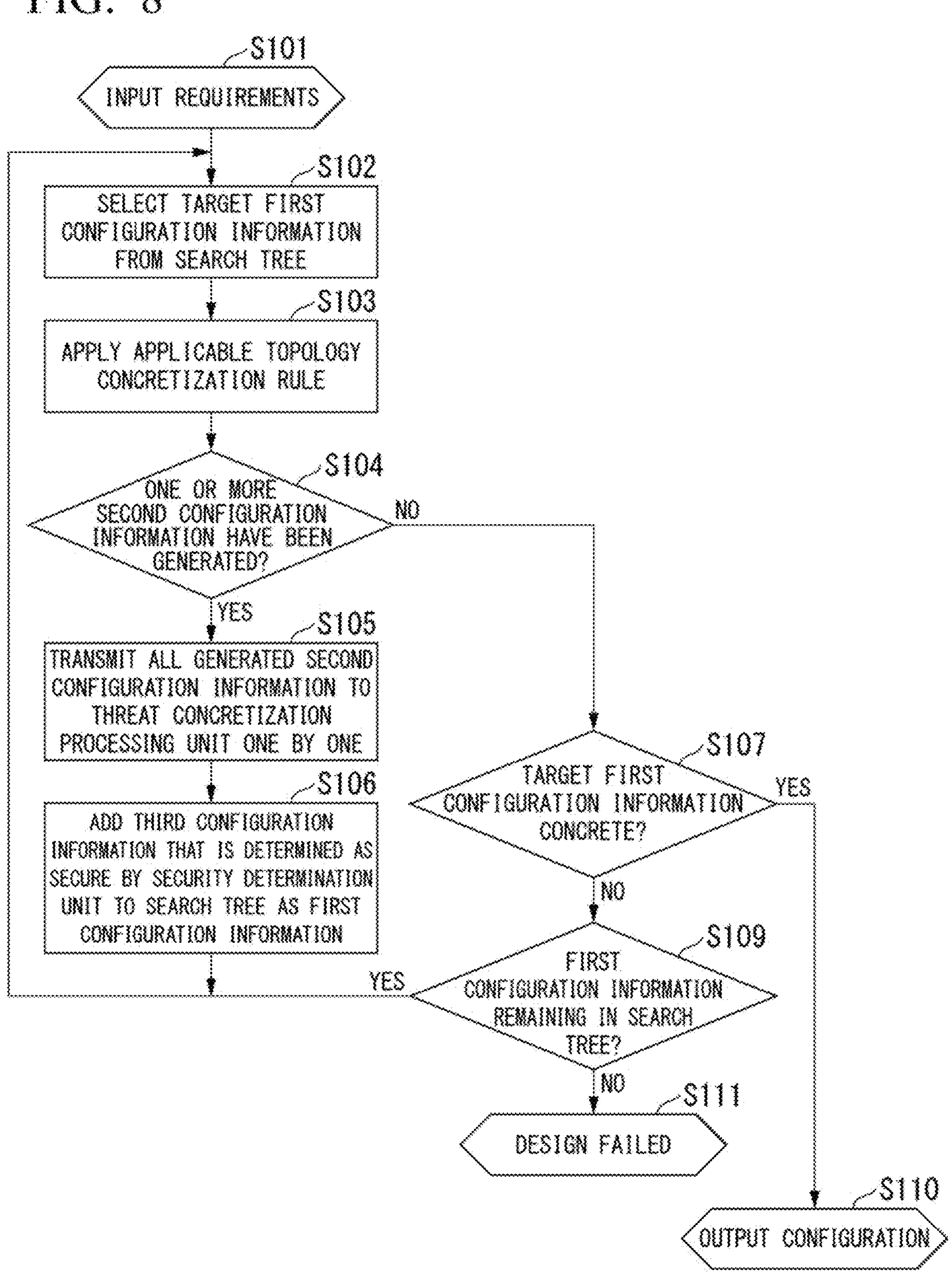
FIG. 8 is a first diagram showing a processing flow of the system design device according to the present example embodiment.

FIG. 8 is a first diagram showing a processing flow of the system design device 100.

The processing flow of the system design device 100 will be described with reference to FIG. 8.

First, the input/output unit 101 of the system design device 100 accepts an input of first configuration information (FIG. 5) corresponding to the system requirements (FIG. 2) from the user (Step S101). The input/output unit 101 outputs search tree data including the first configuration information, to the configuration concretization unit 12. At the start of the processing, the search tree data contains only first configuration information including the topology of the computer system specified through the system requirements input operation performed by the user.

The configuration concretization unit 12 selects from the search tree, configuration information for which application of a topology concretization rule (FIG. 6) is to be considered (Step S102). At the start of the processing, the search tree does not contain any configuration information other than the input first configuration information shown in FIG. 5, so in such a case, the configuration concretization unit 12 selects the first configuration information shown in FIG. 5. Which configuration information in the search tree is selected depends on the system specifications of the system design device performing the search. As an example, the configuration information corresponding to the node closest to the root node in the search tree that has not undergone configuration concretization processing in the search tree may be selected.

Next, the configuration concretization unit 12 applies the applicable topology concretization rule to the selected first configuration information (Step S103) to generate second configuration information. At this time, if there are multiple applicable topology concretization rules, for example, three, the configuration concretization unit 12 obtains three instances of second configuration information by applying the respective rules. For example, in a case where the topology concretization rule shown in FIG. 6 is applied to the first configuration information in FIG. 5, second configuration information is generated by updating the first configuration information as shown in FIG. 10 as an example.

The configuration concretization unit 12 determines whether one or more instances of second configuration information have been generated through the topology concretization process (Step S104). The application of any topology concretization rule to first configuration information will invariably result in the generation of at least one new instance of second configuration information. If the determination in Step S104 is "No", it indicates that no topology concretization rules could be applied to the targeted first configuration information. In this example, the first configuration information shown in FIG. 5 includes applicable topology concretization rules, resulting in the generation of at least one new instance of second configuration information as shown in FIG. 10. In such a case, the configuration concretization unit 12 determines "Yes" in Step S104.

If one or more instances of second configuration information have been determined as having been generated through the topology concretization process (Step S104: Yes), the configuration concretization unit 12 transmits each generated second configuration information individually to the threat concretization unit 13 (Step S105), and the threat concretization unit 13 performs the threat concretization process. The analysis unit 14 analyzes the third configuration information after the threat concretization process is completed. After the configuration concretization unit 12 passes one instance of second configuration information to the threat concretization unit 13, the threat concretization unit 13 generates third configuration information based on the second configuration information, which is then processed by the analysis unit 14. This process of passing, generating, and analyzing is repeated for each generated second configuration information. The analysis unit 14 sequentially outputs the results of the security determination process S5 concerning one or more third configuration information instances, to the configuration concretization unit 12. If the generated third configuration information is determined as insecure through the security determination, the configuration concretization unit 12 discards that third configuration information. The configuration concretization unit 12 adds third configuration information that was not determined as insecure by the security determination, as new first configuration information positioned as a node under the first configuration information used to generate the third configuration information in the search tree (Step S106). This process results in the generation of search tree data as illustrated in FIG. 3. Through the repeated execution of the processes described above, the first configuration information remaining as candidates for topology concretization rules application within the search tree, is sequentially limited to configuration information that is not determined as insecure.

If one or more instances of second configuration information cannot be generated through the topology concretization process using either added first configuration information at the extremity of the search tree or unprocessed first configuration information, the configuration concretization unit 12 determines "No" in Step S104, and determines whether the one first configuration information instance for which it has been determined that second configuration information cannot be generated is concrete (Step S107). For example, the configuration concretization unit 12 uses the first configuration information at the extremity of the search tree selected as the target, and if there are no further configuration components that can be added to all the configuration components included in the first configuration information and all the configuration components included in the first configuration information are concrete, it determines that the first configuration information is concrete. In this process, if no topology concretization rule corresponding to the ids or types of the configuration components is stored, the configuration concretization unit 12 can determine that there is no configuration component that can be added to the configuration components included in the first configuration information.

If the determination in Step S107 is No, that is, if the selected target first configuration information is not concrete, this indicates that the first configuration information has abstract components remaining even though the topology concretization rules cannot be applied in Step S103. In such a case, the configuration concretization unit 12 determines that the first configuration information is inappropriate as a design result, and determines whether other first configuration information remains in the search tree (Step S109). If unprocessed first configuration information remains in the search tree (Step S109: Yes), the configuration concretization unit 12 returns to Step S102 to reselect first configuration information and repeat the process. If no unprocessed first configuration information is determined as remaining in the search tree (Step S109: No), it means that all instances of first configuration information present in the search tree has been determined as insecure or inappropriate as a design result, and therefore the configuration concretization unit 12 outputs information indicating a design failure, to the input/output unit 11 (Step S111).

On the other hand, if the determination in Step S107 is Yes, it means that the system configuration indicated by the targeted first configuration information is concrete and has been added to the search tree, and therefore has not been determined as insecure. Therefore, the configuration concretization unit 12 outputs the first configuration information to the input/output unit 11 (Step S110). The input/output unit 11 outputs the first configuration information to an output device such as a monitor so that the user can visually confirm the first configuration information as a result of the system design.

Figure 9:
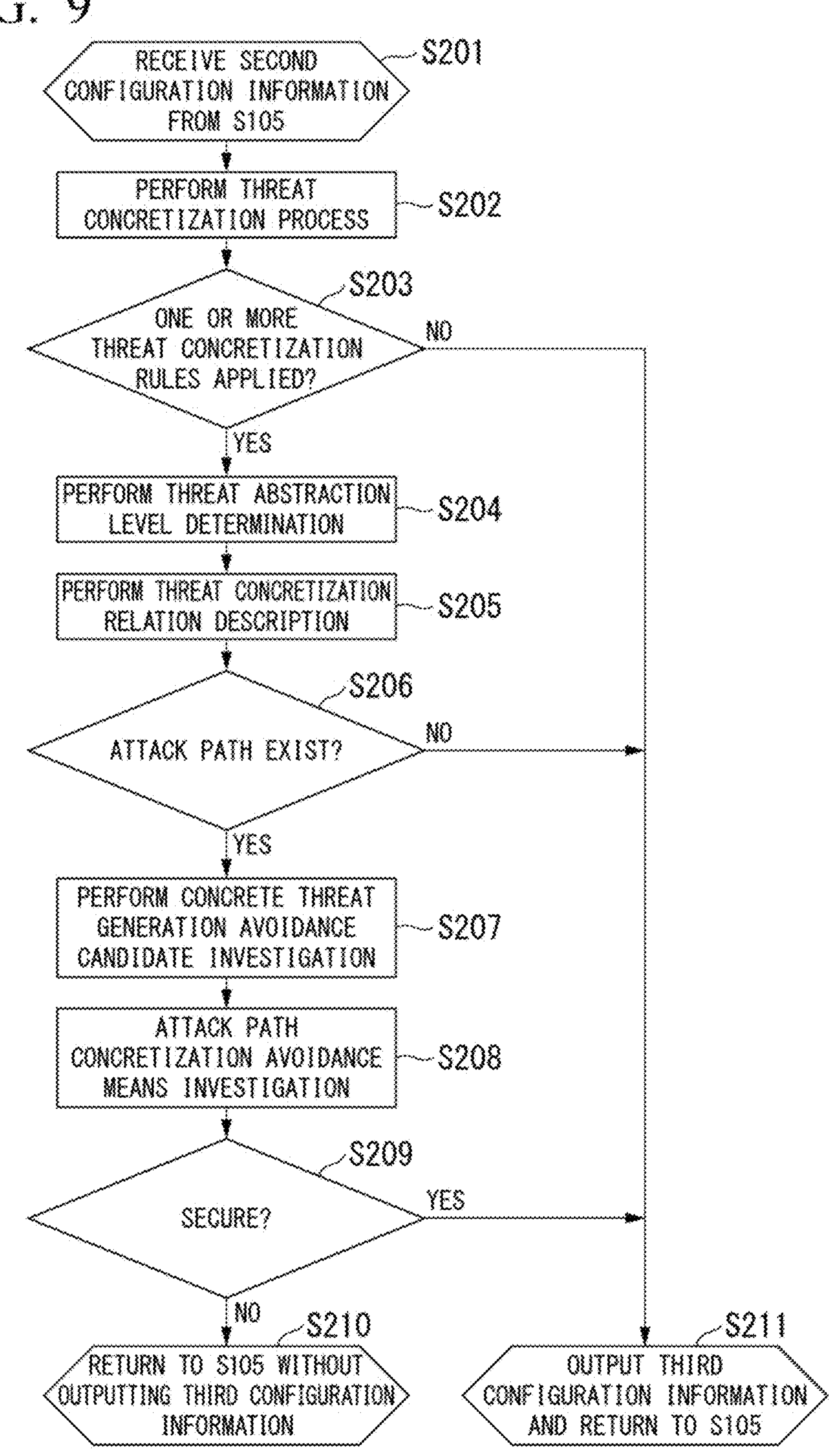
FIG. 9 is a second diagram showing a processing flow of the system design device according to the present example embodiment.

FIG. 9 is a second diagram showing the processing flow of the system design device 100.

FIG. 10 is a diagram showing a concrete example of second configuration information.

FIG. 11 is a first diagram showing a concrete example of third configuration information.

FIG. 12 is a second diagram showing a concrete example of the third configuration information.

FIG. 13 is a third diagram showing a concrete example of the third configuration information.

Next, the processing of each of the threat concretization unit 13 and the analysis unit 14 will be described, using FIG. 9 to FIG. 13. The processing performed by the threat concretization unit 13 and the analysis unit 14 is a concrete example of the processing in Step S105 and Step S106 described above. The threat concretization unit 13 receives second configuration information generated by the configuration concretization unit 12 (Step S201). The threat concretization unit 13 applies the threat concretization process S0 to the received second configuration information (Step S202). The threat concretization process S0 performs the following process for all threat concretization rules, and the process ends in a case where it is determined that no more threat concretization rules can be applied, and proceeds to a conditional branch (Step S203).

Specifically, the processing of Step S202 examines whether there is threat information within the target second configuration information that matches the "type" and "location (configuration component)" information described in the "concretization origin" of a specific threat concretization rule. For all threats described in the second configuration information that match the "type" and "location (configuration component)" information described in the "concretization origin" of the threat concretization rule, the processing searches for whether there exists a configuration component within the second configuration information that matches the information listed in the "configuration condition" of the threat concretization rule.

As an example, consider a situation in which the threat concretization unit 13 applies the threat concretization rule of FIG. 7 to the second configuration information shown in FIG. 10. In such a case, the threat concretization unit 13 determines whether the threat type "T_NetSni" and location "edge (app_A, app_B)" specified in the "concretization origin" of the threat concretization rule (FIG. 7) match the corresponding threat type and location information included in the second configuration information (FIG. 10). If there is a match, the threat concretization unit 13 searches for whether configuration components within the second configuration information correspond to the configuration components indicated by the "configuration condition" in the threat concretization rule.

At this time, in the process of comparing information regarding threats described as the "concretization origin" in the threat concretization rules and the second configuration information, the threat concretization unit 13 performs processing by replacing the provisional node ids (app_A, app_B) described as the "location" item of the threat description in the threat concretization rule with the actual node ids (App1, App2) present in the description of the configuration components in the second configuration information. The threat concretization unit 13 also verifies that the description of the "edge" type "http" in the "configuration condition" of the threat concretization rule matches the type "http" of the edge between the node ids that have actually been replaced as the "location" item of the threat in the second configuration information. The threat concretization unit 13 applies the threat concretization rule to the second configuration information only if the description of the "edge" type "http" in the "configuration condition" of the threat concretization rule matches the type "http" of the edge between the node ids that is actually replaced as the "location" item of the threat in the second configuration information.

Moreover, if the threat concretization unit 13 successfully matches the description of the type "http" of the "edge" in the "configuration condition" of the threat concretization rule with the description of the type "http" of the edge between the node ids that has actually been replaced as the "location" item of the threat in the second configuration information, it adds the content of the "concretization destination" in the threat concretization rule to the second configuration information. FIG. 11 shows third configuration information that is a result of applying the threat concretization rule of FIG. 7 to the second configuration information of FIG. 10.

The processing of the threat concretization unit 13 will be described more simply. Assume that the threat concretization rule of FIG. 7 describes a rule R61 relating to a certain threat and a configuration condition rule R62 that defines a configuration component (location) where the threat may occur. Also suppose that in the case where the same relationship between the threat and the configuration condition indicated by the rule R61 and the rule R62 is described in the second configuration information, a rule R63 regarding a threat in another configuration component that contributes to the occurrence of the threat indicated by the rule R61 is defined in the threat concretization rule. The threat concretization unit 13 uses the second configuration information (FIG. 10) to detect that a description of a threat that is the same as the rule R61 regarding a threat in the threat concretization rule (FIG. 7) exists in the second configuration information (threat a71 in FIG. 10), and further detects that a description corresponding to the configuration condition rule R62, which is associated with the rule R61, exists in the second configuration information (configuration c91 of FIG. 10). In such a case, the threat concretization unit 13 generates third configuration information (FIG. 11) by adding another threat a72 that contributes to the occurrence of the threat a71, to the second configuration information (FIG. 10). As a result, the third configuration information (FIG. 11) will include descriptions of information on the threat a71, the configuration component in which the threat a71 may occur, the threat a72 that contributes to the occurrence of the threat a71, and the configuration component in which the threat a72 may occur ("location" described in a72). In the case where the threat concretization rule describe the existence of another threat that contributes to the occurrence of the threat a72, information about the another threat and the configuration component in which the threat may occur are described in the third configuration information.

The processing of the threat concretization unit 13 described above determines whether or not an event that poses a threat to the security of the computer system may occur in a configuration component such as a node or edge in the topology configuration (second configuration information) of the concretized computer system. The processing of the threat concretization unit 13 is an example aspect of generating third configuration information by adding information indicating a relationship between: an identifier of a threat if a threat event may occur in a certain configuration component; the configuration component in which the threat may occur; an identifier of another threat that contributes to the occurrence of the threat; and another configuration component in which the another threat may occur, to second configuration information.

FIG. 11 shows a text representation of the third configuration information immediately after the application of the threat concretization rule, and a schematic diagram of a system configuration in which the third configuration information is graphically represented is shown on the right side of the arrow in the center of FIG. 11. In generating the third configuration information, in a case where the threat concretization unit 13 adds information on the concretization destination to the threat description in the second configuration information based on the information on the concretization destination location and type described in the threat concretization rule (rule R63 in FIG. 7), there are cases where the same information on the description of the location and type has already been described as the threat description in the second configuration information. In such a case, the threat concretization unit 13 examines whether the "concretization origin" information of the existing threat in the second configuration information matches the "concretization origin" information of the threat concretization rule to be applied (rule R61 of FIG. 7). If there is a match, it means that the threat concretization process S0, which has been performed once in the past, is being applied to the same threat, and therefore the threat concretization unit 13 invalidates the application of that threat concretization rule to the second configuration information and determines that "the threat concretization rule could not be applied". The threat concretization unit 13 attempts to apply the same process to all the threat concretization rules to the second configuration information, and then determines whether any of the threat concretization rules has been applied (Step S203). If at least one threat concretization rule is applied to the second configuration information, the threat concretization unit 13 performs the threat abstraction level determination process S1 (Step S204). If none of the threat concretization rules could be applied to the second configuration information, the threat concretization unit 13 outputs the second configuration information to the configuration concretization unit 12 as third configuration information without proceeding to the threat abstraction level determination process S1 (Step S211). The configuration concretization unit 12 outputs the third configuration information to the input/output unit 11. The third configuration information output from the analysis unit 14 without any threat concretization rules being applied to the second configuration information will not be determined as insecure configuration information.

In the threat abstraction level determination process S1, the threat concretization unit 13 determines whether each threat present in the third configuration information is abstract or concrete. In this determination, if the configuration component in which the threat occurs and its adjacent node or edge are all concrete and no configuration component that prevents the threat can be assigned to those configuration components, the threat concretization unit 13 determines the threat as concrete (concrete threat), otherwise, it determines the threat as abstract (abstract threat).

To describe the threat abstraction level determination process S1 using an example of the present example embodiment, the newly added threat (a72) in the third configuration information shown in FIG. 11 exists on "App1", and both of the two adjacent edges ("hosted_on" and "http") are concrete edges. In the present example embodiment, the configuration component where the newly added threat (a72) may occur in the third configuration information, and its adjacent configuration components, are defined as follows: the component type for "App1" is "App", and the types of the two edges adjacent to this configuration component are "hosted_on" and "http", and based on these configuration components, the system design device 100 preliminarily stores in a database or the like, information indicating that there is no function to prevent the threat that may occur in these configuration components. Based on the information stored in the database, if the adjacent configuration components are determined as not having the function to prevent the threat, the threat concretization unit 13 determines in the threat abstraction level determination process S1 that the threat described in the third configuration information is concrete (concrete threat). In such a case, the threat concretization unit 13 adds information indicating "concrete" to the "abstraction level" in the description of the target threat in the third configuration information (d11 of FIG. 12). If the information from the database indicating that the configuration component or its adjacent configuration components in which the threat (a72) newly added to the third configuration information may occur do not have a function to prevent the threat, the threat concretization unit 13 may determine the abstraction level of this threat as abstract (abstract threat). In such a case, the threat concretization unit 13 adds information indicating "abstract" to the "abstraction level" in the description of the target threat (a72) in the third configuration information. FIG. 12 is a text representation of the third configuration information corrected by the threat concretization unit 13, and shows a schematic diagram of the third configuration information graphically represented on the right side of the arrow illustrated in the center. The technique of this threat abstraction level determination process S1 is not limited to this example.

The threat concretization unit 13 performs the threat abstraction level determination process S1 for all threats described in the third configuration information, and then performs the threat concretization relationship description process S2 (Step S205). The threat concretization relationship description process S2 is a process in which in the case where an event that poses a threat to the security of the computer system may occur in a node or edge in the concretized topology configuration, third configuration information is generated by adding information indicating the relationship between; the identifier of the threat, the configuration component in which the threat may occur, the identifier of another threat contributing to the occurrence of the threat, and another configuration component in which this another threat may occur.

Now, the third configuration information (FIG. 12) describes information on a threat a71 and a threat a72. The threat a71 is a threat that may occur with the contribution of the threat a72, and in the third configuration information (FIG. 12), information on the threat a72 is an information instance added through the application of the threat concretization rule (FIG. 7). The threat concretization unit 13 adds information (type, location) c121 of another configuration component (concretization destination (refined to)) defined in the rule R63 of the threat concretization rule (FIG. 7), to the item of the threat a71 in the third configuration information (FIG. 12) as information (type, location) of the another configuration component (concretization destination (refined to)) in which the threat a72 contributing to the occurrence of the threat of threat a71 may occur (FIG. 13). Also, the threat concretization unit 13 adds information (type, location) c122 of the configuration component (concretization origin (refined from)) defined in the rule R61 of the threat concretization rule (FIG. 7), to the item of the threat a72 in the third configuration information (FIG. 12) as information (type, location) of the configuration component (concretization origin (refined from)) in which the threat a71 may occur (FIG. 13).

By performing this threat concretization relationship description process S2, it becomes possible to trace from the third configuration information, which threat may occur in another configuration component and which threat's influence can cause it to occur, thereby making it possible to output a list of threats that constitute a threat chain path (attack path) based on the relationship between a threat and another threat that contributes to the occurrence of the threat.

Upon completing the threat concretization relationship description process S2, the threat concretization unit 13 determines, based on the generated third configuration information, whether or not there is a threat chain path (attack path) based on the relationship between the threat and another threat contributing to the occurrence of the threat (Step S206). The threat concretization unit 13 acquires information regarding the description of one or more threats described in the third configuration information (FIG. 13), and determines whether there is information regarding an attack-origin-type threat as information indicating an "attack type". The threat concretization unit 13 instructs the analysis unit 14 to start processing if the information acquired about threats includes information on an attack-origin-type threat as information indicating an "attack type". If there is no information on an attack-origin-type threat, no threats indicating attack-endpoint-type threats as "attack type" will occur. If no information on attack-origin-type threats exist as information indicating an "attack type" in the information acquired about threats, the threat concretization unit 13 instructs the analysis unit 14 to skip processing the third configuration information because the configuration of the computer system indicated by the third configuration information is not determined as insecure. If the acquired threat information does not include information indicating "attack type," specifically an attack-origin-type threat, it is confirmed that the third configuration information will not be determined as insecure, and therefore the analysis unit 14 skips the processing (the concrete threat generation avoidance candidate investigation process S3, the attack path concretization avoidance means investigation process S4, and the security determination process S5) and outputs the third configuration information to the configuration concretization unit 12 (Step S211).

The information indicating "attack type" is automatically described as configuration information in a case where the user sets the threat on the GUI screen, or it is inherited from information preliminarily described in the rule R63 regarding the configuration component where another threat that contributes to the occurrence of the threat (concretization destination (refined to)) may occur, and is added to the third configuration information. In the case where "attack type" indicates an attack-origin-type threat, it means that the threat is one that can occur without the contribution of another threat. In the case where "attack type" indicates an attack-endpoint-type threat, the threat refers to a threat that ultimately occurs as a result of the contribution of another threat. In the case where "attack type" indicates "other threat", the threat is neither an attack-origin-type threat nor an attack-endpoint-type threat.

If information of an attack-origin-type threat exists in information indicating "attack type" of the information regarding descriptions of one or more threats described in the third configuration information (FIG. 13), the analysis unit 14 performs the concrete threat generation avoidance candidate investigation process S3 (Step S207).

In the processing of the concrete threat generation avoidance candidate investigation process S3, the analysis unit 14 identifies the threat that has been determined as an abstract threat in the threat abstraction level determination process S1. For each threat that has been determined to be an abstract threat, the analysis unit 14 examines whether there exists a method of concretizing a configuration component that can avoid the threat from being determined as a concrete threat.

Figure 14:
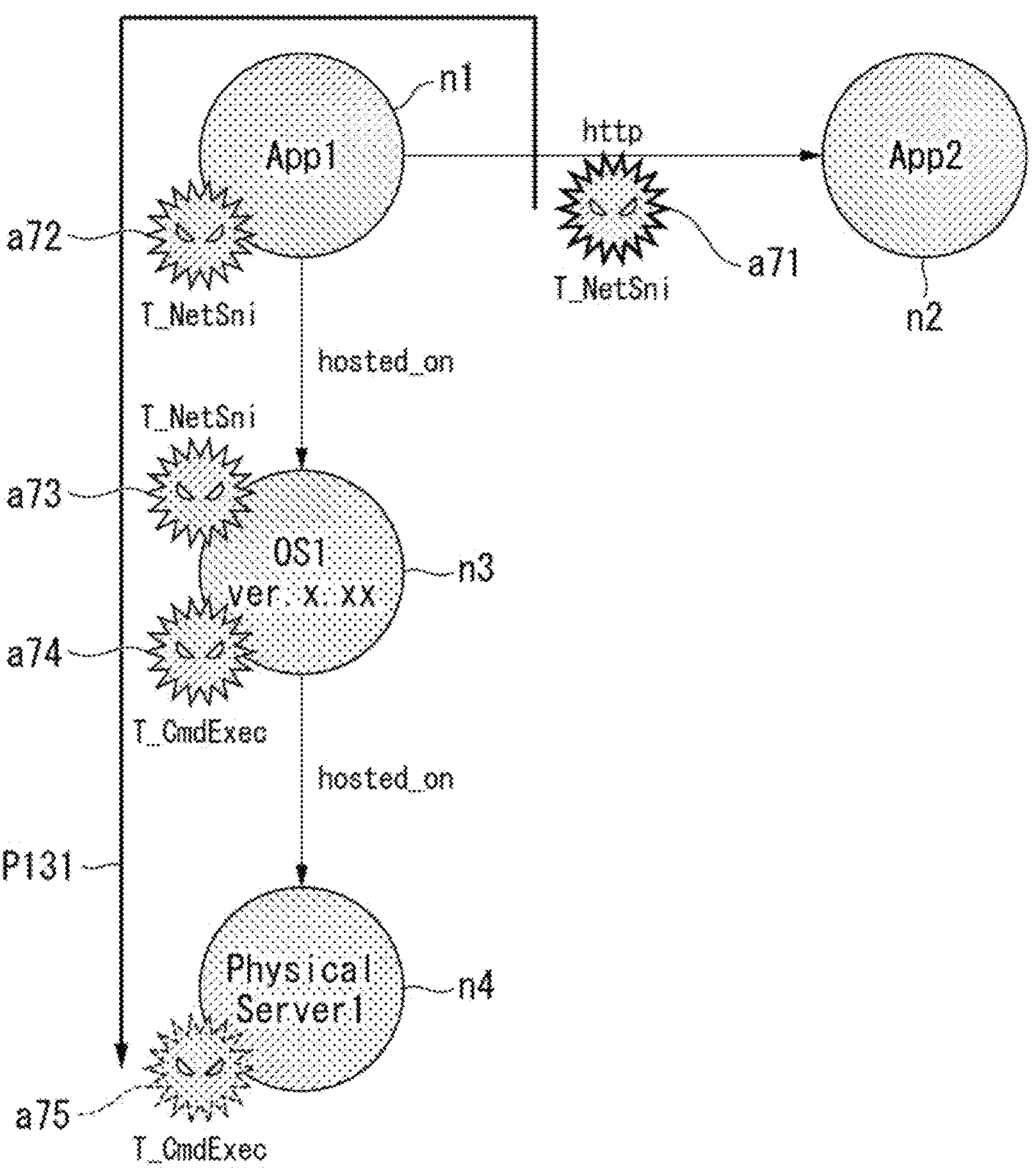
FIG. 14 is a first diagram for describing details of a process S3 of an analysis unit according to the present example embodiment.

FIG. 14 is a first diagram for describing details of the process S3 of the analysis unit 14.

Figure 15:
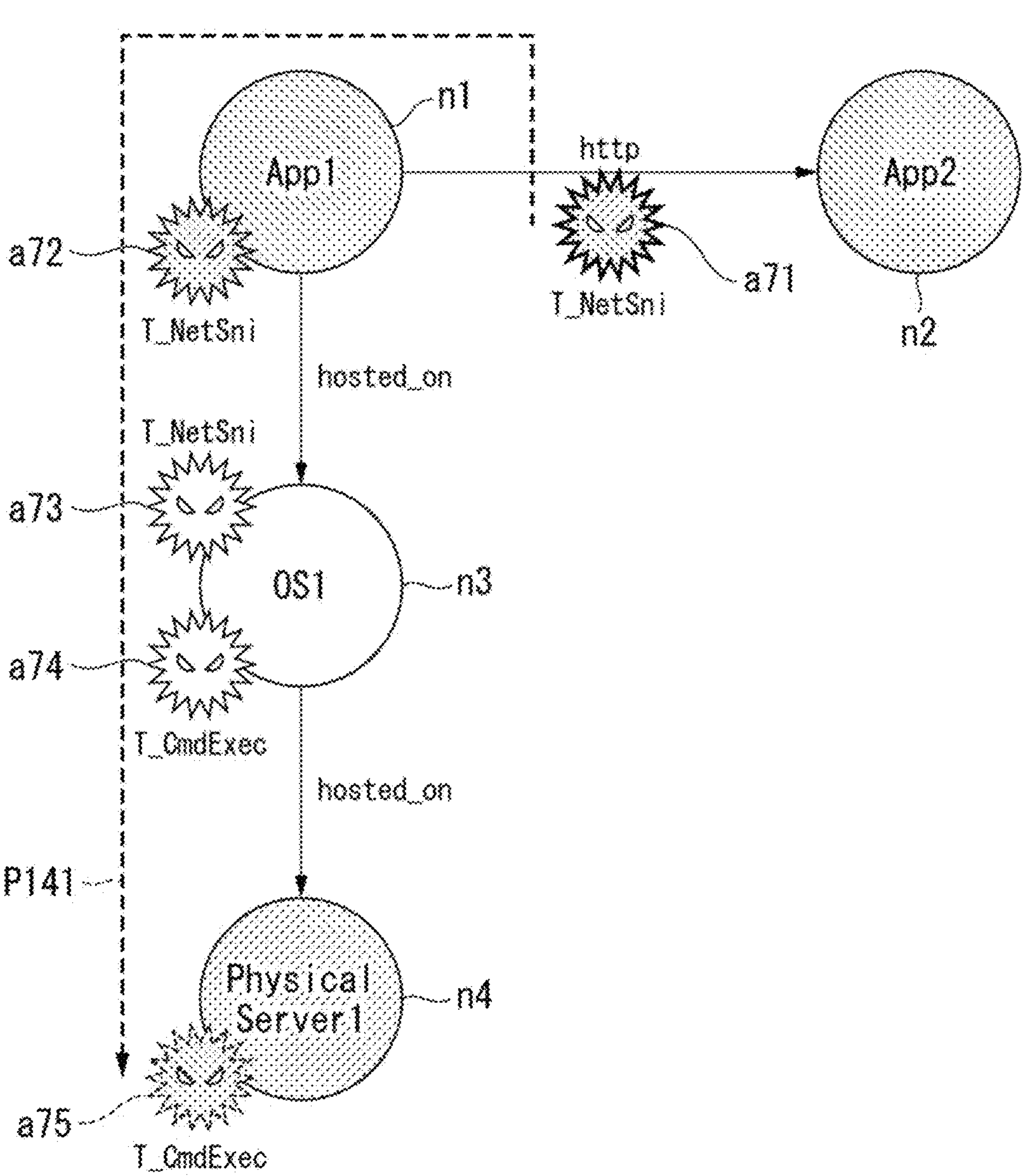
FIG. 15 is a second diagram for describing details of the process S3 of the analysis unit according to the present example embodiment.

FIG. 15 is a second diagram for describing details of the process S3 of the analysis unit 14.

Using FIG. 14 and FIG. 15, the processing of the concrete threat generation avoidance candidate investigation process S3 is described in detail.

It is assumed that the third configuration information shown in FIG. 14 has been generated through the processing up to the threat concretization unit 13. The third configuration information shown in FIG. 14 describes, based on the threat concretization process, that the node of OS1 corresponding to the schematic diagram of the system configuration represented on the right side of the arrow in the center of FIG. 12 is replaced with a node n3 of an OS called OS 1_ver.x.xx, that two threats (a73, a74) that constitute an attack path may occur at the node n3, and that another threat a75 contributing to the occurrence of threat a74 that may occur at the node n3 may occur at another node n4. The OS of the node n4 is a node called Physical Server1. An attack path P131 that can be identified by the third configuration information shown in FIG. 14 indicates a concrete attack path.

Moreover, in another example, it is assumed that the third configuration information shown in FIG. 15 has been generated through the processing up to the threat concretization unit 13. The third configuration information shown in FIG. 15 describes, based on the threat concretization process, that the network topology up to the node n3 of OS1 corresponding to the schematic diagram of the system configuration represented on the right side of the arrow in the center of FIG. 12 remains unchanged, that two threats (a73, a74) that constitute an attack path may occur at the node n3, and that another threat a75 contributing to the occurrence of threat a74 that may occur at the node n3 may occur at another node n4. The OS of the node n4 is a node called Physical Server1. An attack path P141 that can be identified by the third configuration information shown in FIG. 15 indicates an abstract attack path.

The schematic diagram of the system configuration based on the third configuration information shown in FIG. 14 differs from the schematic diagram of the system configuration based on the third configuration information shown in FIG. 15 in that the node n3 between the node n1 "App1" and the node n4 "Physical Server1" is either an abstract node "OS1" or a concrete node "OS 1 ver x.xx". "OS 1 ver x.xx" or "OS1" indicates the node id. The storage unit of the system design device 100 stores information indicating whether the node is a concrete node or an abstract node, in association with the node id. In the system design device 100, information indicating whether the OS (for example, "OS 1 ver x.xx") has a feature of preventing threats is recorded in the storage unit of the system design device 100, in association with the id representing the OS. The feature of preventing threats may be, for example, a feature in which an OS defect has been improved or a program has been improved in order to prevent all known attack techniques, such as eavesdropping, on known computer systems. It should be noted that ver x.xx indicates the version number of a predetermined OS. Also, the storage unit of the system design device 100 has information "OS 1 ver x.xx" described in association with the id "OS1" as the id of the OS in the case where this OS is concretized.

In such a case, the analysis unit 14 has acquired third configuration information as shown in FIG. 15. Then, the analysis unit 14 has succeeded in identifying the attack path P141 shown in FIG. 15 from the third configuration information. The analysis unit P141 identifies from the storage unit, using node ids, edge ids, and similar identifiers, whether the nodes and edges in attack path P141, where a threat a71, a threat a72, a threat a73, a threat a74, and a threat a75 may occur, are abstract or concrete. If at least one of the configuration components of the nodes or edges where a threat may occur is abstract, the analysis unit 14 determines that the attack path P141 is an abstract attack path. If at least all of the configuration components of the nodes or edges where a threat may occur are concrete, the analysis unit 14 determines that the attack path P141 is a concrete attack path. In the example of FIG. 15, the id of the node n3 indicates "OS1", and this id being an abstract node is recorded in the storage unit, so the analysis unit 14 determines the attack path P141 as an abstract attack path. An abstract node is a node where it is unclear whether a concrete threat occurs. Therefore, in the attack path P141 determined as an abstract attack path, it is not clear whether a concrete threat occurs at a node determined as an abstract node.

In the case where the attack path P141 in the acquired third configuration information is an abstract attack path, the analysis unit 14 identifies an abstract node in the attack path P141. The analysis unit 14 acquires the node id "OS1" of the abstract node. The analysis unit 14 determines whether information is recorded indicating that this OS has the feature of preventing threats, in association with the node id "OS1". If there is no information recorded in association with the node id "OS1" that indicates that this OS has the feature of preventing threats, the analysis unit 14 determines whether there is another OS recorded in the storage unit that is a candidate for concretizing the OS, in association with the node id "OS1". Assume that "OS 1 ver. x.xx" is recorded as another candidate OS for concretizing the OS, in association with the node id "OS1". The analysis unit 14 reads the information of "OS 1 ver. x.xx". Also, the analysis unit 14 acquires information on whether or not the another OS has the feature to prevent threats, which is associated with the id of "OS 1 ver. x.xx" and recorded in the storage unit. It is assumed that the information indicating whether or not the another OS has a feature to prevent threats, which is associated with the id "OS 1 ver. x.xx" and recorded in the storage unit, is an information instance indicating that the another OS does not have a feature to prevent threats. In such a case, the analysis unit 14 can replace such an information instance with the third configuration information shown in FIG. 14, based on the third configuration information acquired from the threat concretization unit 13 as shown in FIG. 15. At this point, it is clear that the threats a73, a74 that may occur at the abstract node (node n3; "OS1") included in the attack path P141 in this third configuration information cannot be prevented, and therefore, the attack path P141 is determined as a concrete attack path in which a threat may occur. The analysis unit 14 performs the same process for all abstract nodes in the attack path that can be identified in the acquired third configuration information.

The analysis unit 14 similarly determines whether all of the abstract nodes that constitute the abstract attack path can be replaced with other concrete nodes, and if they can be replaced with concrete nodes, determines whether the OS of the concrete nodes can be given the feature to prevent threats (S3), and then starts the attack path concretization avoidance means investigation process S4. It should be noted that, in an abstract attack path, if the abstract nodes that constitute the path can be replaced with other concrete nodes and the OS of the concrete nodes cannot be given the feature to prevent threats, then the abstract attack path is an attack path that has no means of avoiding being replaced with a concrete threat. In other words, if an abstract node that constitutes an abstract attack path can be replaced with a concrete node and the OS of that concrete node cannot be given the feature to prevent the threat, the analysis unit 14 estimates that the generation of a concrete threat cannot be avoided at that abstract node. If an abstract node that constitutes an abstract attack path can be replaced with a concrete node and the OS of that concrete node cannot be given the feature to prevent threats, the analysis unit 14 also uses that information in the attack path concretization avoidance means investigation process S4.

Figure 16:
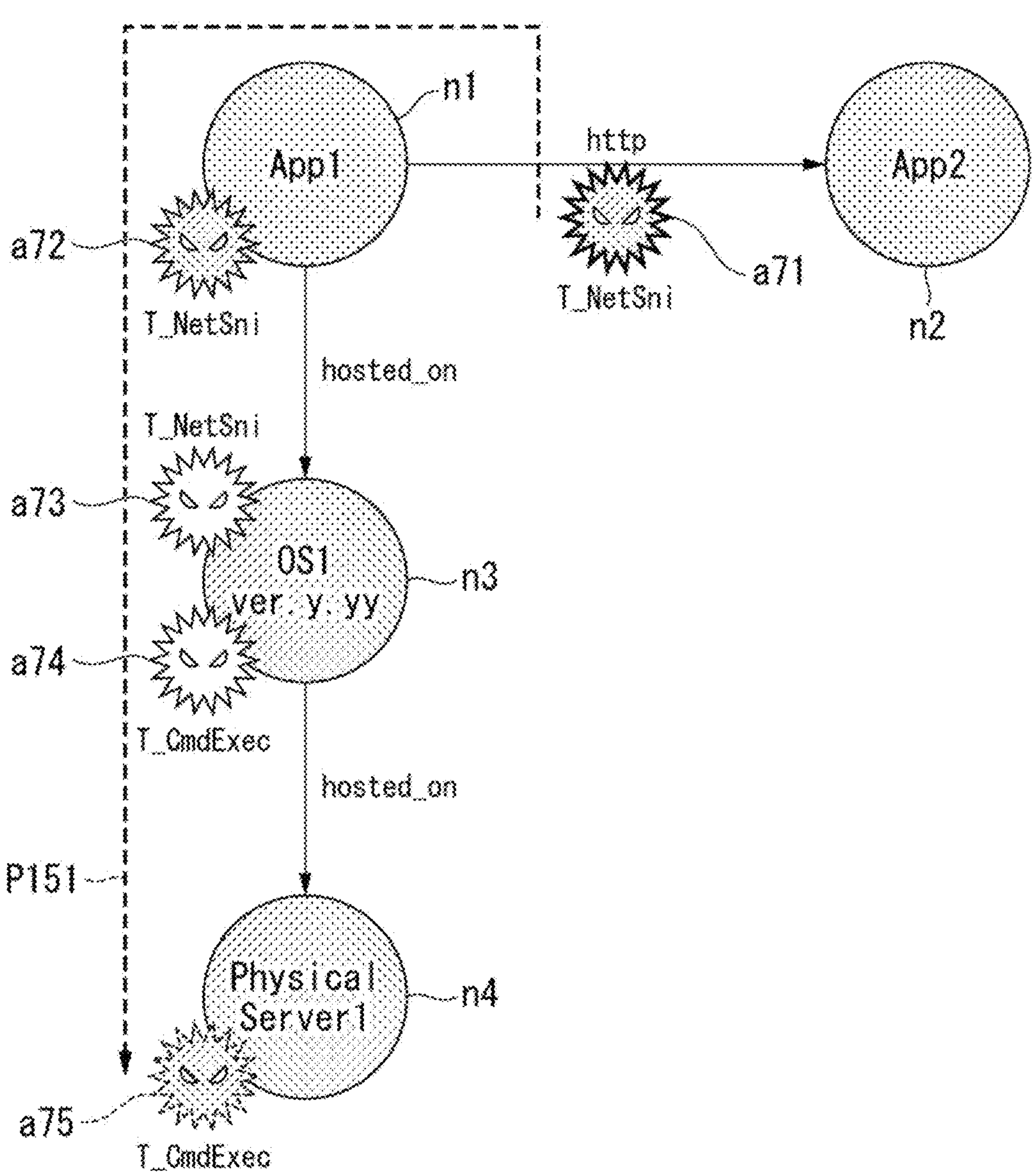
FIG. 16 is a second diagram for describing details of a process S4 of the analysis unit according to the present example embodiment.

FIG. 16 is a diagram for describing details of the process S4 of the analysis unit.

The process of the attack path concretization avoidance means investigation process S4 will be described in more detail, with reference to FIG. 16.

In the attack path concretization avoidance means investigation process S4, the analysis unit 14 examines whether there is a means for avoiding the generation of a concrete attack path that can be identified by the third configuration information (Step S208). In this process, the analysis unit 14 determines whether or not a concrete attack path exists among one or more identifiable attack paths, based on the third configuration information. If the analysis unit 14 determines that there is no concrete attack path, all attack paths that can be identified from the third configuration information are abstract attack paths. Since there is at least one abstract threat among the threats that constitute an abstract attack path, the analysis unit 14 determines whether there is a means of avoiding the replacement of all abstract threats in each abstract attack path with concrete threats, based on the results of the concrete threat generation avoidance candidate investigation process S3.

If the analysis unit 14 determines that there is a means of avoiding replacing even one of the abstract threats present in the abstract attack path with a concrete threat, it determines that the abstract attack path "can be avoided from being concretized". If the analysis unit 14 determines that there is no means of avoiding replacing all of the abstract threats present in the abstract attack path with a concrete threat, it determines that the abstract attack path "cannot be avoided from being concretized".

For example, suppose that the only concretization candidate for "OS1" is "OS 1 ver x.xx" as shown in FIG. 14. In such a case, it is assumed that the information indicating whether or not the another OS has a feature to prevent threats, which is associated with the id "OS 1 ver. x.xx" and recorded in the storage unit, is an information instance indicating that the another OS does not have a feature to prevent threats. In such a case, the analysis unit 14 determines that this abstract attack path "cannot be avoided from being concretized" because there is no means of avoiding its replacement with a concrete threat. Even after replacing the abstract nodes in the abstract attack path with concrete nodes, the occurrence of threats at those concrete nodes cannot be prevented, causing the threats to become concrete. Therefore, it can be determined that avoiding the concretization of the threats is impossible.

FIG. 16 is a schematic diagram of configuration information in which a topology concretization is performed to avoid concretization of the attack path P141, which is the abstract attack path in FIG. 15.

Meanwhile, as shown in FIG. 16, suppose that another OS called "OS 1 ver y.yy" is recorded in the storage unit as a concretization candidate of "OS1", and the node of this type of OS has a function of preventing threats. In such a case, the analysis unit 14 identifies "OS 1 ver y.yy", which is a concretization candidate of "OS1", from the storage unit, and acquires information on whether or not "OS 1 ver y.yy" has a feature to prevent threats, which is recorded in the storage unit in association with the id of this "OS 1 ver y.yy". Suppose that this information indicates that the the concretization candidate has a feature to prevent threats. In such a case, the analysis unit 14 determines that this abstract attack path is not classified as "unable to avoid concretization" because there is a means of avoiding its replacement with a concrete threat. Even after replacing the abstract nodes in the abstract attack path with concrete nodes, the occurrence of threats at those concrete nodes can be prevented, and thus the threats will not become concrete. Therefore, it can be determined that avoiding the concretization of the threats is not impossible.

After the above processing is performed, the security determination process is performed in the security determination process S5 (Step S209).

In the security determination process S5, the analysis unit 14 performs a security determination process to determine whether the third configuration information is insecure, based on the examination result in the attack path concretization avoidance means investigation process S4. In the security determination process S5, the analysis unit 14 determines that the system configuration indicated by the third configuration information is "insecure" if no concrete attack path exists in the attack paths that can be identified from the third configuration information and if all abstract attack paths are determined as unable to avoid concretization.

In the case of the present example embodiment, if an attack path P131 as shown in FIG. 14 can be identified based on the third configuration information, the analysis unit 14 determines that the attack path is a concrete attack path and therefore is insecure.

If an attack path P141 as shown in FIG. 15 can be identified based on the third configuration information, the analysis unit 14 determines that the attack path is an abstract attack path, however, the only concretization candidate for the abstract node "OS1" in the abstract attack path is "OS 1 ver x.xx", and the concretization of the abstract attack path cannot be avoided, so that the attack path is determined as insecure.

If an attack path P151 as shown in FIG. 16 can be identified based on the third configuration information, the analysis unit 14 determines that the attack path is an abstract attack path. However, "OS 1 ver x.xx" exists as a concretization candidate for the abstract node "OS1" in the abstract attack path, and there is a means of avoiding the concretization of the abstract attack path, so that the attack path is not determined as insecure.

If the system configuration indicated by the third configuration information cannot be determined as insecure, the analysis unit 14 outputs the third configuration information to the configuration concretization unit 12 to add it to the search tree, and returns to the processing of Step S105 (Step S211). If the system configuration indicated by the third configuration information is determined as insecure, the analysis unit 14 does not output the third configuration information to the configuration concretization unit 12 to discard the third configuration information, and returns to the processing of Step S105 (Step S210). The configuration concretization unit 12 adds the third configuration information that cannot be determined as insecure as new first configuration information to the search tree data, positioned as a node under the first configuration information used to generate the third configuration information. In a case where the analysis unit 14 completes the process for all the configuration information in Step S105, the configuration concretization unit 12 repeats the process from Step S102.

The system design device 100 repeats the processing of the configuration concretization unit 12, the threat concretization unit 13, and the analysis unit 14 described above to generate search tree data as shown in FIG. 3, and if the determination in Step S104 is No, performs the processing of the Step S107 described above.

According to the system design device 100 described above, not only configuration information in which a concrete attack path is established, but also configuration information in which an abstract attack path exists that is determined to have no means of avoiding being replaced by a concrete attack path in the future can be immediately determined as insecure in the system configuration based on that configuration information, and it can be discarded from the processing results as a system design. Therefore, it is possible to omit the process of determining whether all patterns that concretize configuration information as system requirements set by the user are insecure, and it is expected that systems that are not determined as insecure can be efficiently derived.

Figure 17:
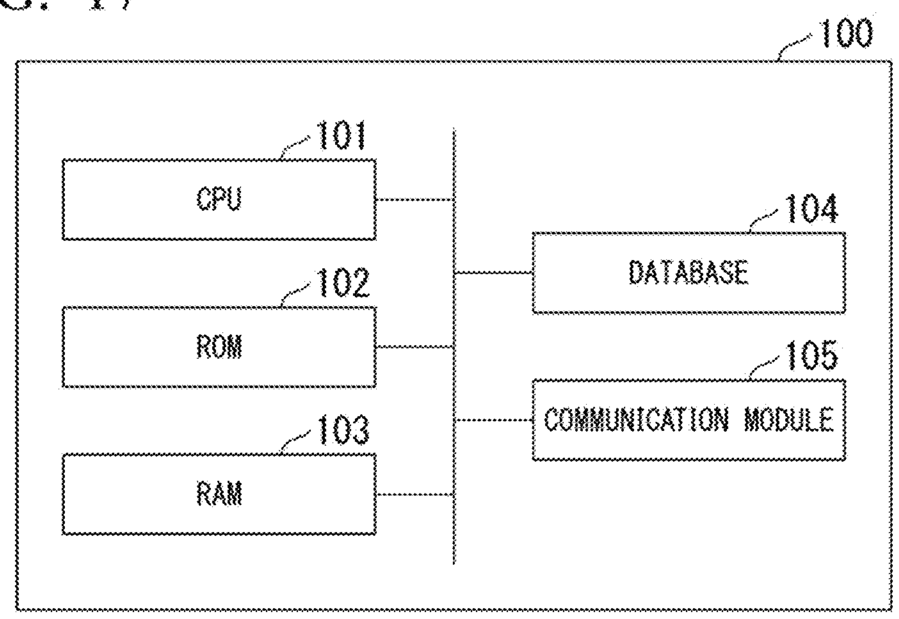
FIG. 17 is a hardware configuration diagram of the system design device according to the present example embodiment.

FIG. 17 is a hardware configuration diagram of the system design device 100. As shown in this figure, the system design device 100 may be a computer that includes hardware components such as a CPU (Central Processing Unit) 101, a ROM (Read Only Memory) 102, a RAM (Random Access Memory) 103, a database 104, and a communication module 105. The functions of the system design device 100 according to each of the example embodiments described above may be implemented by an information processing system in which multiple information processing devices are provided with one or more of the functions described above and are configured to cooperate with each other to perform the overall processing.

Figure 18:
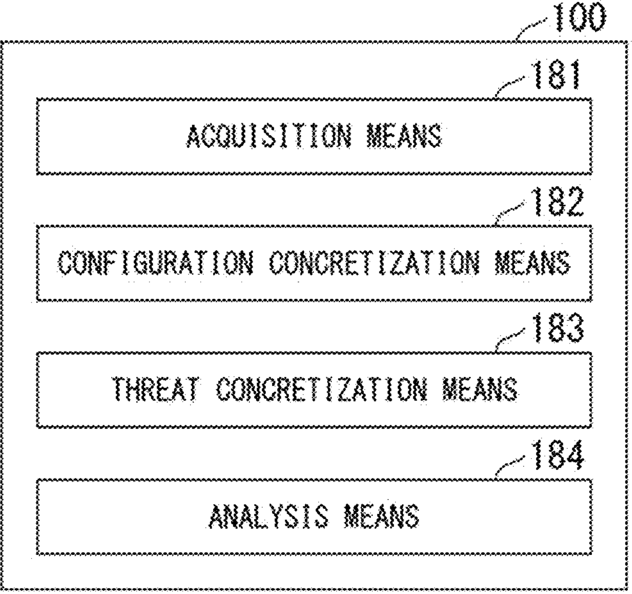
FIG. 18 is a diagram showing a minimum configuration of the system design device according to the present example embodiment.

FIG. 18 is a diagram showing a minimum configuration of the system design device 100.

As shown in this figure, the system design device 100 at least includes the functions of an acquisition means 181, a configuration concretization means 182, a threat concretization means 183, and an analysis means 184.

The acquisition means 181 acquires first configuration information including at least information on the topology of a computer system that uses any configuration component of nodes in the computer system and edges indicating relationships between the nodes.

The configuration concretization means 182 generates second configuration information that concretizes the topology configuration of the computer system by adding a node or edge of the computer system in the first configuration information.

The threat concretization means 183 determines whether or not an event that poses a threat to the security of the computer system may occur at a node or edge in the concretized topology configuration. The threat concretization means generates third configuration information by adding information indicating the relationship between: the identifier of a threat if a threat event may occur; a configuration component in which the threat may occur; the identifier of another threat that contributes to the occurrence of the threat; and another configuration component in which the another threat may occur, to second configuration information.

The analysis means 184 determines whether the content of each threat is concrete or abstract in the threat chain path based on the relationship between the threat in the third configuration information and another threat that contributes to the occurrence of the threat. The analysis means 184 determines whether or not the design of the computer system in the third configuration information is insecure in both cases where the content of the threat is concrete and where the content of the threat is abstract. In this process, the analysis means 184 determines the design of the computer system of the third configuration information as insecure if the content of the threat is all concrete in the threat chain path, or if the content of the threat is abstract in any configuration component of the threat chain path but it is determined that there is no means of avoiding the abstract threat from being replaced with a concrete threat.

Also, the program mentioned above may be a program for realizing some of the functions described above. Further-more, the program may be a so-called difference file (a difference program) which can realize the functions described above in combination with a program already recorded in the computer system.

The whole or part of the example embodiment disclosed above can be described as, but not limited to, the following supplementary notes.

(Supplementary Note 1)

A system design device comprising:

an acquisition means that acquires first configuration information at least including information on a topology of a computer system using configuration components in the computer system;

a configuration concretization means that generates second configuration information that concretizes a configuration of the topology in the first configuration information;

a threat concretization means that determines whether or not a security threat event may occur in the configuration component of the concretized topology, and generates third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information; and an analysis means that determines whether a content of each threat is concrete or abstract in a threat chain path based on a relationship between the threat in the third configuration information and another threat that contributes to the occurrence of the threat, and determines whether or not a design of a computer system in this third configuration information is insecure if a content of the threat is concrete or if it is abstract, wherein the analysis means determines the design of the computer system of the third configuration information as insecure if the content of the threat is all concrete in the threat chain path, or if the content of the threat is abstract in any configuration component of the threat chain path and it is determined that there is no means of avoiding the abstract threat from being replaced with a concrete threat.

(Supplementary Note 2)

The system design device according to supplementary note 1, wherein the configuration concretization means:

generates the second configuration information that concretizes one of grouping units of the predetermined configuration components in the topology of the computer system of the first configuration information input at the start of processing;

repeats a process of generating new second configuration information that concretizes one of grouping units of the predetermined configuration components in the topology of the computer system of the first configuration information, where the third configuration information, generated based on the second configuration information, and not determined to be insecure in the design of the computer system, is used as the new first configuration information;

repeats a process of generating the third configuration information based on the second configuration information; and outputs the third configuration information as a design result if none of the grouping units of the predetermined configuration components in the topology of the computer system of the third configuration information can be further concretized and the design of the computer system of the third configuration information is not determined as insecure.

(Supplementary Note 3)

The system design device according to supplementary note 1 or 2, wherein the threat concretization means gives information indicating whether the information on threat to be added to the second configuration information is concrete or abstract based on a threat concretization rule indicating a threat defined according to the topology, to the third configuration information, and if the content of the threat is all concrete in the threat chain path based on the information given to the third configuration information, or if the content of the threat is abstract in any configuration component of the threat chain path but it is determined that there is no means of avoiding the abstract threat from being replaced with a concrete threat, the analysis means determines the design of the computer system of the third configuration information as insecure.

(Supplementary Note 4)

The system design device according to any one of supplementary notes 1 to 3, wherein if the abstract threat is included in the threat chain path, the analysis means identifies the path as an abstract attack path indicating the threat chain path along which a security attack may occur, based on the threat included in the path, and if the abstract threat is not included in the threat chain path, the analysis means identifies the path as a concrete attack path indicating the threat chain path along which a security attack may occur, based on the threat included in the path.

(Supplementary Note 5)

The system design device according to supplementary note 4, wherein if the content of the threat is such that any configuration component of the abstract attack path is abstract and all configuration components in which the abstract threat may occur cannot be given the characteristic of preventing the threat, the analysis means determines that there is no means of avoiding the abstract threat from being replaced with a concrete threat, and determines that the design of the computer system of the third configuration information as insecure.

DESCRIPTION OF REFERENCE SIGNS

100 System design device

11 Input/output unit (acquisition means 181)

12 Configuration concretization unit (configuration concretization means 182)

13 Threat concretization unit (threat concretization means 183)

14 Analysis unit (analysis means 184)

What is claimed is:

1. A system design device comprising:

at least one memory configured to store instructions; and at least one processor configured to execute the instructions to:

acquire first configuration information at least including information on a topology of a computer system using configuration components in the computer system;

generate second configuration information that concretizes a configuration of the topology in the first configuration information;

determine whether or not a security threat event may occur in the configuration component of the concretized topology, and generate third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information;

determine whether a content of each threat is concrete or abstract in a threat chain path based on a relationship between the threat in the third configuration information and another threat that contributes to the occurrence of the threat, and determine whether or not a design of a computer system in this third configuration information is insecure if a content of the threat is concrete or if it is abstract; and determine the design of the computer system of the third configuration information as insecure if the content of the threat is all concrete in the threat chain path, or if the content of the threat is abstract in any configuration component of the threat chain path and it is determined that the abstract threat is unavoidably replaced with a concrete threat.

2. The system design device according to claim 1, wherein the at least one processor is configured to execute the instructions to:

generate the second configuration information that concretizes one of grouping units of predetermined configuration components in the topology of the computer system of the first configuration information input at the start of processing;

repeat a process of generating new second configuration information that concretizes the one of grouping units of the predetermined configuration components in the topology of the computer system of the first configuration information, where the third configuration information, generated based on the second configuration information, and not determined to be insecure in the design of the computer system, is used as new first configuration information;

repeat a process of generating the third configuration information based on the second configuration information; and output the third configuration information as a design result if none of the grouping units of the predetermined configuration components in the topology of the computer system of the third configuration information can be further concretized and the design of the computer system of the third configuration information is not determined as insecure.

3. The system design device according to claim 1, wherein the at least one processor is configured to execute the instructions to give information indicating whether information on threat to be added to the second configuration information is concrete or abstract based on a threat concretization rule indicating a threat defined according to the topology, to the third configuration information, and wherein the at least one processor is configured to execute the instructions to determine the design of the computer system of the third configuration information as insecure (1) if the content of the threat is all concrete in the threat chain path based on the information given to the third configuration information, or (2) if the content of the threat is abstract in any configuration component of the threat chain path and it is determined that there is no means of avoiding the abstract threat from being replaced with the concrete threat.

4. The system design device according to claim 3, wherein the at least one processor is configured to execute the instructions to:

identify, if the abstract threat is included in the threat chain path, the path as an abstract attack path indicating the threat chain path along which a security attack may occur, based on the threat included in the path; and identify, if the abstract threat is not included in the threat chain path, the path as a concrete attack path indicating the threat chain path along which a security attack may occur, based on the threat included in the path.

5. The system design device according to claim 4, wherein the at least one processor is configured to execute the instructions to, if the content of the threat is such that any configuration component of the abstract attack path is abstract and all configuration components in which the abstract threat may occur cannot be given the characteristic of preventing the threat, determine that there is no means of avoiding the abstract threat from being replaced with the concrete threat; and determine the design of the computer system of the third configuration information as insecure.

6. A system design method comprising:

acquiring first configuration information at least including information on a topology of a computer system using configuration components in the computer system;

generating second configuration information that concretizes a configuration of the topology in the first configuration information;

determining whether or not a security threat event may occur in the configuration component of the concretized topology, and generating third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information;

determining whether a content of each threat is concrete or abstract in a threat chain path based on a relationship between the threat in the third configuration information and another threat that contributes to the occurrence of the threat, and determining whether or not a design of a computer system in this third configuration information is insecure if a content of the threat is concrete or if it is abstract; and determining the design of the computer system of the third configuration information as insecure if the content of the threat is all concrete in the threat chain path, or if the content of the threat is abstract in any configuration component of the threat chain path and it is determined that the abstract threat is unavoidably replaced with a concrete threat.

7. A non-transitory storage medium storing a program that causes a computer of a system design device to execute:

acquiring first configuration information at least including information on a topology of a computer system using configuration components in the computer system;

generating second configuration information that concretizes a configuration of the topology in the first configuration information;

determining whether or not a security threat event may occur in the configuration component of the concretized topology, and generates third configuration information by adding information indicating a relationship between: an identifier of a threat if a threat event may occur; the configuration component in which the threat may occur; an identifier of another threat contributing to the occurrence of the threat; and another configuration component in which this another threat may occur, to the second configuration information;

determining whether a content of each threat is concrete or abstract in a threat chain path based on a relationship between the threat in the third configuration information and another threat that contributes to the occurrence of the threat, and determining whether or not a design of a computer system in this third configuration information is insecure if a content of the threat is concrete or if it is abstract; and determining the design of the computer system of the third configuration information as insecure if the content of the threat is all concrete in the threat chain path, or if the content of the threat is abstract in any configuration component of the threat chain path and it is determined that the abstract threat is unavoidably replaced with a concrete threat.

* * * * *